United States Patent
Inada et al.

(10) Patent No.: US 12,200,386 B2
(45) Date of Patent: Jan. 14, 2025

(54) IMAGE SENSOR AND ELECTRONIC DEVICE COMPRISING THE SAME

(71) Applicant: Samsung Electronics Co., Ltd., Suwon-si (KR)

(72) Inventors: Takahiko Inada, Suwon-si (KR); Dongwook Won, Suwon-si (KR); Hyunjin Jeon, Suwon-si (KR); Jaeheum Baek, Suwon-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 186 days.

(21) Appl. No.: 18/149,273

(22) Filed: Jan. 3, 2023

(65) Prior Publication Data

US 2023/0239595 A1 Jul. 27, 2023

(30) Foreign Application Priority Data

Jan. 21, 2022 (KR) .................. 10-2022-0009234
Aug. 25, 2022 (KR) .................. 10-2022-0107159

(51) Int. Cl.
*H04N 25/78* (2023.01)
*H04N 25/76* (2023.01)
*H04N 25/77* (2023.01)

(52) U.S. Cl.
CPC ............ *H04N 25/78* (2023.01); *H04N 25/77* (2023.01); *H04N 25/7795* (2023.01)

(58) Field of Classification Search
CPC .. H04N 25/778; H04N 25/7795; H04N 25/77; H04N 25/779; H04N 25/40; H04N 25/42; H04N 25/78; H04N 25/531

(Continued)

(56) References Cited

U.S. PATENT DOCUMENTS 7,479,995 B2 * 1/2009 Dosluoglu ............. H04N 25/78
                                                           348/241
7,990,439 B2 * 8/2011 Kume .................. H04N 25/618
                                                           348/241

(Continued)

FOREIGN PATENT DOCUMENTS

KR    10-2013-0135293    12/2013
KR    10-2015-0130303    11/2015

(Continued)

OTHER PUBLICATIONS

European Search Report dated Apr. 4, 2023 for corresponding EP Patent Application No. 23151776.4.

*Primary Examiner* — Pritham D Prabhakher
(74) *Attorney, Agent, or Firm* — Harness, Dickey & Pierce, P.L.C.

(57) ABSTRACT

An image sensor includes a pixel array including a first pixel and a second pixel which are connected to a same column line, the first pixel including 2N sub-pixels sharing a first floating diffusion node and the second pixel including 2N sub-pixels sharing a second floating diffusion node, wherein N is a positive integer greater than or equal to two, a timing generator configured to change a reset order and a readout order of 4N sub-pixels included in the first pixel and the second pixel, according to an exposure time setting value, and output a row address according to the changed orders, and a row driver configured to drive the pixel array based on the row address.

17 Claims, 28 Drawing Sheets

(58) Field of Classification Search
USPC .................................................. 348/207.99
See application file for complete search history.

(56) References Cited

U.S. PATENT DOCUMENTS

| | | | | |
|---|---|---|---|---|
| 8,174,590 | B2* | 5/2012 | Honda | H04N 23/67 |
| | | | | 348/241 |
| 8,199,232 | B2* | 6/2012 | Watanabe | H04N 25/771 |
| | | | | 348/297 |
| 9,124,830 | B2* | 9/2015 | Ogura | H04N 25/63 |
| 9,214,491 | B2* | 12/2015 | Okita | H04N 25/778 |
| 9,699,429 | B2* | 7/2017 | Kaizu | G06T 3/4015 |
| 9,762,830 | B2 | 9/2017 | Jiang et al. | |
| 9,967,495 | B2 | 5/2018 | Shin | |
| 10,531,034 | B2* | 1/2020 | Rotte | H04N 25/75 |
| 10,854,649 | B2* | 12/2020 | Kwag | H01L 27/14641 |
| 11,025,849 | B2* | 6/2021 | Tsukida | H04N 25/75 |
| 11,064,138 | B2 | 7/2021 | Diasparra et al. | |
| 11,265,489 | B2* | 3/2022 | Shim | H04N 25/778 |
| 11,848,338 | B2* | 12/2023 | Park | H04N 23/45 |
| 2008/0180558 | A1* | 7/2008 | Watanabe | H04N 25/771 |
| | | | | 348/E3.019 |
| 2009/0021622 | A1* | 1/2009 | Kume | H04N 25/673 |
| | | | | 348/E5.091 |
| 2011/0228122 | A1* | 9/2011 | Takenaka | H04N 25/74 |
| | | | | 348/222.1 |
| 2015/0029358 | A1* | 1/2015 | Kaizu | H04N 23/843 |
| | | | | 348/223.1 |
| 2017/0223294 | A1* | 8/2017 | Shin | H04N 25/778 |
| 2017/0251188 | A1* | 8/2017 | Kaizu | H04N 23/741 |
| 2017/0318252 | A1 | 11/2017 | Minagawa et al. | |
| 2018/0278875 | A1* | 9/2018 | Rotte | H01L 27/14641 |
| 2019/0237498 | A1* | 8/2019 | Kwag | H04N 25/778 |
| 2019/0363119 | A1* | 11/2019 | Kwag | H01L 27/14609 |
| 2020/0322553 | A1* | 10/2020 | Shim | H04N 25/59 |
| 2021/0306586 | A1 | 9/2021 | Yamamoto et al. | |
| 2022/0123033 | A1* | 4/2022 | Park | H01L 27/14605 |

FOREIGN PATENT DOCUMENTS

| | | |
|---|---|---|
| KR | 10-2017-0090848 | 8/2017 |
| KR | 10-2020-0096949 | 8/2020 |
| KR | 10-2021-0052444 | 5/2021 |
| WO | WO-2018-230367 A1 | 12/2018 |

\* cited by examiner

FIG. 8A

| CIT=1 | | 1H | 2H | 3H | 4H | 5H | 6H | 7H | 8H | 9H | 10H | 11H | 12H |
|---|---|---|---|---|---|---|---|---|---|---|---|---|---|
| Row1 | Even | | | | Gr1 Reset | Gr1 Readout | | | | | | | |
| | Odd | | | | | | R1 Reset | R1 Readout | | | | | |
| Row2 | Even | | | | | | | | B1 Reset | B1 Readout | | | |
| | Odd | | | | | Gr2 Reset | Gr2 Readout | | | | | | |
| Row3 | Even | | | | | | | R2 Reset | R2 Readout | | | | |
| | Odd | | | | | | | | | | Gb1 Reset | Gb1 Readout | |
| Row4 | Even | | | | | | | | | B2 Reset | B2 Readout | | |
| | Odd | | | | | | | | | | | Gb2 Reset | Gb2 Readout |

FIG. 8B

| CIT=2 | | 1H | 2H | 3H | 4H | 5H | 6H | 7H | 8H | 9H | 10H | 11H | 12H |
|---|---|---|---|---|---|---|---|---|---|---|---|---|---|
| Row1 | Even | | | Gr1 Reset | | Gr1 Readout | | | | | | | |
| | Odd | | | | R1 Reset | | R1 Readout | | | | | | |
| Row2 | Even | | | | | | | B1 Reset | Gb1 Reset | B1 Readout | Gb1 Readout | | |
| | Odd | | | | | | | | | | | | |
| Row3 | Even | | | | | Gr2 Reset | | Gr2 Readout | | | | | |
| | Odd | | | | | | R2 Reset | | R2 Readout | | | | |
| Row4 | Even | | | | | | | | B2 Reset | Gb2 Reset | B2 Readout | | Gb2 Readout |
| | Odd | | | | | | | | | | | | |

FIG. 8C

| CIT=3 | | 1H | 2H | 3H | 4H | 5H | 6H | 7H | 8H | 9H | 10H | 11H | 12H |
|---|---|---|---|---|---|---|---|---|---|---|---|---|---|
| Row1 | Even | | Gr1 Reset | | | Gr1 Readout | | | | | | | |
| | Odd | | | | R1 Reset | | | R1 Readout | | | | | |
| Row2 | Even | | | Gr2 Reset | | | B1 Reset | | | B1 Readout | | | |
| | Odd | | | | | | Gr2 Readout | | Gb1 Reset | | | Gb1 Readout | |
| Row3 | Even | | | | | R2 Reset | | B2 Reset | | | | | |
| | Odd | | | | | | | | R2 Readout | | | | |
| Row4 | Even | | | | | | | | | Gb2 Reset | B2 Readout | | |
| | Odd | | | | | | | | | | | | Gb2 Readout |

FIG. 8D

| CIT=4 | | 1H | 2H | 3H | 4H | 5H | 6H | 7H | 8H | 9H | 10H | 11H | 12H |
|---|---|---|---|---|---|---|---|---|---|---|---|---|---|
| Row1 | Even | Gr1 Reset | | | | Gr1 Readout | | | | | | | |
| | Odd | | R1 Reset | | | | R1 Readout | | | | | | |
| Row2 | Even | | | B1 Reset | | | | B1 Readout | | | | | |
| | Odd | | | | Gb1 Reset | | | | Gb1 Readout | | | | |
| Row3 | Even | | | | | Gr2 Reset | | | | Gr2 Readout | | | |
| | Odd | | | | | | R2 Reset | | | | R2 Readout | | |
| Row4 | Even | | | | | | | B2 Reset | | | | B2 Readout | |
| | Odd | | | | | | | | Gb2 Reset | | | | Gb2 Readout |

FIG. 12A

| IR_ADD | 0 | 1 | 2 | 3 | 4 | 5 | 6 | 7 |
|---|---|---|---|---|---|---|---|---|
| TVS(CIT=1 or 3) | 0 | −1 | 2 | 1 | 3 | 2 | 5 | 4 |
| RR_ADD_0 | 0 | 2 | 0 | 2 | 1 | 3 | 1 | 3 |
| RR_ADD_1 | 4 | 6 | 4 | 6 | 5 | 7 | 5 | 7 |
| E_O phase | E | E | O | O | E | E | O | O |
| Readout Sub-pixel | Gr1 | Gr2 | R1 | R2 | B1 | B2 | Gb1 | Gb2 |
| | Gr3 | Gr4 | R3 | R4 | B3 | B4 | Gb3 | Gb4 |

FIG. 12B

| IR_ADD | 0 | 1 | 2 | 3 | 4 | 5 | 6 | 7 |
|---|---|---|---|---|---|---|---|---|
| TVS(CIT=2) | 0 | 1 | 0 | 1 | 3 | 4 | 3 | 4 |
| RR_ADD_0 | 0 | 0 | 2 | 2 | 1 | 1 | 3 | 3 |
| RR_ADD_1 | 4 | 4 | 6 | 6 | 5 | 5 | 7 | 7 |
| E_O phase | E | O | E | O | E | O | E | O |
| Readout Sub-pixel | Gr1 | R1 | Gr2 | R2 | B1 | Gb1 | B2 | Gb2 |
| | Gr3 | R3 | Gr4 | R4 | B3 | Gb3 | B4 | Gb4 |

FIG. 12C

| IR_ADD | 0 | 1 | 2 | 3 | 4 | 5 | 6 | 7 |
|---|---|---|---|---|---|---|---|---|
| TVS(CIT≥4) | 0 | 1 | 1 | 2 | 2 | 3 | 3 | 4 |
| RR_ADD_0 | 0 | 0 | 1 | 1 | 2 | 2 | 3 | 3 |
| RR_ADD_1 | 4 | 4 | 5 | 5 | 6 | 6 | 7 | 7 |
| E_O phase | E | O | E | O | E | O | E | O |
| Readout Sub-pixel | Gr1 | R1 | B1 | Gb1 | Gr2 | R2 | B2 | Gb2 |
| | Gr3 | R3 | B3 | Gb3 | Gr4 | R4 | B4 | Gb4 |

IMAGE SENSOR AND ELECTRONIC DEVICE COMPRISING THE SAME

CROSS-REFERENCE TO RELATED APPLICATIONS

This application is based on and claims priority under 35 U.S.C. § 119 to Korean Patent Application No. 10-2022-0009234, filed on Jan. 21, 2022, and Korean Patent Application No. 10-2022-0107159, filed on Aug. 25, 2022, in the Korean Intellectual Property Office, the disclosures of which are incorporated by reference herein in their entireties.

BACKGROUND

The inventive concepts relate to image sensors, and more particularly, to image sensors having an extended dynamic range and operating methods thereof.

An image sensor is a device that captures a two-dimensional or three-dimensional image of an object. An image sensor generates an image of an object by using a photoelectric conversion element that reacts according to an intensity of light reflected by the object. As progress has been made in the complementary metal-oxide semiconductor (CMOS) technology, a CMOS image sensor using a CMOS is widely used. Also, as the resolution of an image sensor has recently increased, an image sensor having a reduced pixel size and an increased dynamic range at the same time is required.

SUMMARY

The inventive concepts provides reading methods of pixel arrays, whereby the exposure time of a pixel array having a shard pixel structure may be reduced.

According to some aspects of the inventive concepts, there is provided an image sensor including a pixel array including a first pixel and a second pixel which are connected to a same column line, the first pixel including N sub-pixels sharing a first floating diffusion node and the second pixel including N sub-pixels sharing a second floating diffusion node, wherein N is a positive integer greater than or equal to two, a timing generator configured to change a reset order and a readout order of 2N sub-pixels included in the first pixel and the second pixel, according to an exposure time setting value, and output a row address according to the changed orders, and a row driver configured to drive the pixel array based on the row address.

According to another aspect of the inventive concept, there is provided an image sensor including a pixel array including a plurality of pixels arranged in a matrix, the plurality of pixels each including N sub-pixels sharing a floating diffusion node, wherein N is an integer greater than or equal to two, a timing generator configured to set a reset order and a readout order of 2N sub-pixels according to an exposure time setting value such that, while 2N sub-pixels provided in the first pixel and the second pixel which are adjacent in a column direction are sequentially read out, in a first horizontal period, a first sub-pixel of the first pixel is read out and a second sub-pixel of the second pixel is reset, and in a second horizontal period, the second sub-pixel of the second pixel is read out and a third sub-pixel of the first pixel is reset, and a row driver configured to drive the pixel array based on a row address provided by the timing generator, according to the reset order and the readout order of the 2N sub-pixels.

According to some aspects of the inventive concepts, there is provided an electronic device including an image sensor which includes a pixel array including a plurality of pixels and is configured to generate image data based on an optical signal received by the pixel array, and an application processor configured to generate an exposure time setting value based on illuminance information indicating an ambient illuminance and transmit the exposure time setting value to the image sensor, wherein the plurality of pixels include a first pixel and a second pixel which are connected to a same column line, and the first pixel and the second pixel each include a plurality of sub-pixels sharing a floating diffusion node, and a reset order and a readout order of the plurality of sub-pixels of the first pixel and the second pixel are changed according to the exposure time setting value.

BRIEF DESCRIPTION OF THE DRAWINGS

Example embodiments will be more clearly understood from the following detailed description taken in conjunction with the accompanying drawings in which:

FIGS. 8A to 8D illustrate a reset order and a readout order according to exposure time setting of a pixel array according to some example embodiments;

FIGS. 12A to 12C illustrate an address calculation method of a timing generator, according to some example embodiments;

DETAILED DESCRIPTION

Hereinafter, example embodiments of the inventive concepts will be described more fully with reference to the accompanying drawings.

Figure 1:
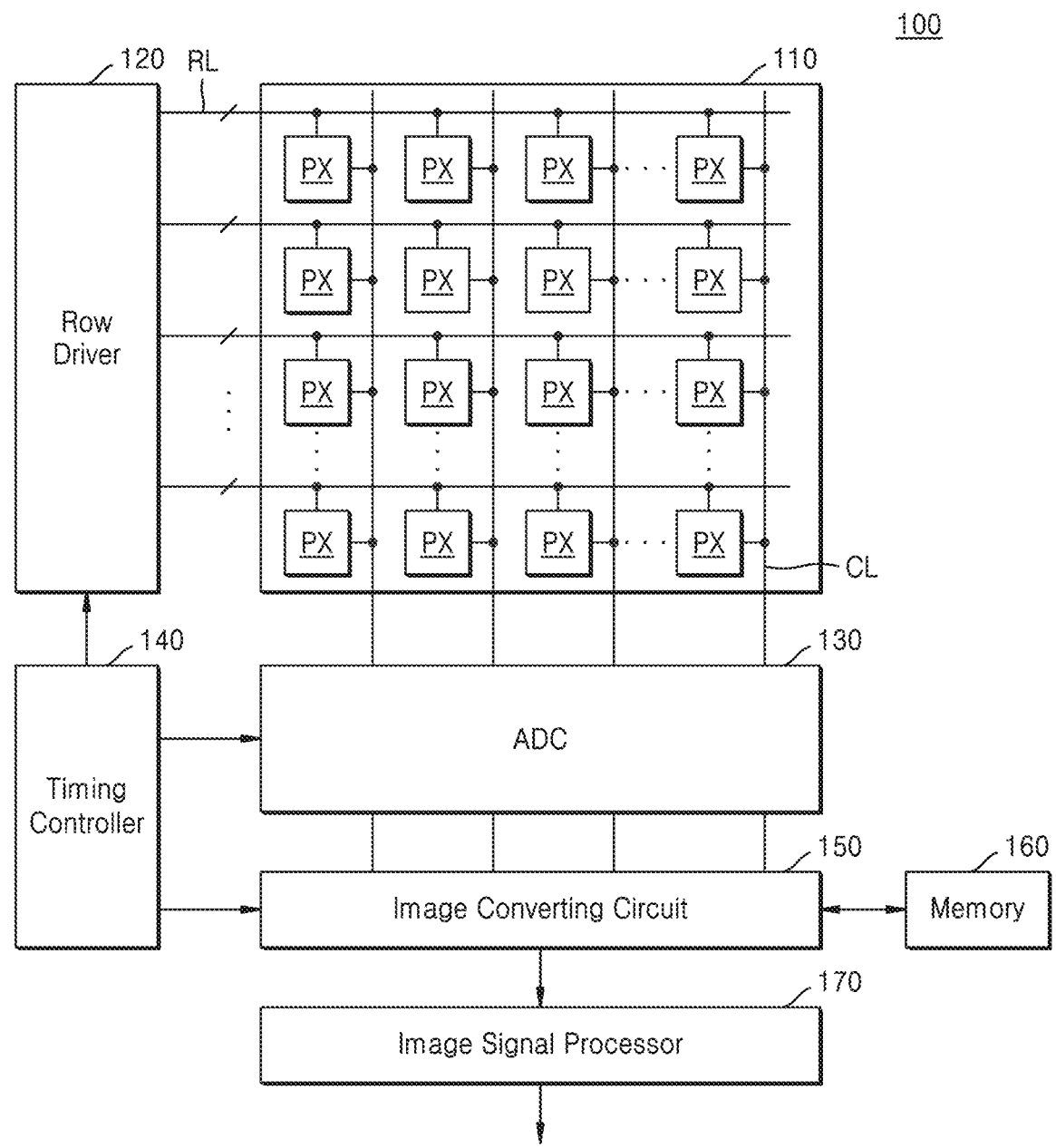
FIG. 1 is a block diagram illustrating an image sensor according to some example embodiments.

FIG. 1 is a block diagram illustrating an image sensor 100 according to some example embodiments.

The image sensor 100 may be mounted in an electronic device having an image or light sensing function. For example, the image sensor 100 may be mounted in an electronic device such as a camera, a smartphone, a wearable device, the Internet of Things (IoT), a tablet personal computer (PC), a personal digital assistant (PDA), a portable multimedia player (PMP), a navigation device, or the like. In addition, the image sensor 100 may be mounted in an electronic device provided as a component of a vehicle, furniture, manufacturing equipment, door, various measurement devices, or the like.

The image sensor 100 may include a pixel array 110, a row driver 120, an analog-to-digital converting circuit 130 (hereinafter referred to as 'ADC circuit'), a timing controller 140, an image converting circuit 150, and a memory 160. The image sensor 100 may further include an image signal processor 170.

The pixel array 110 includes a plurality of row lines RL, a plurality of column lines CL, and a plurality of pixels PX that are connected to the plurality of row lines RL and the plurality of column lines CL and arranged in a matrix.

The pixels PX may sense light by using a photoelectric conversion element, and may output an image signal that is an electrical signal according to the sensed light. The photoelectric conversion element may include an optical sensor element including an organic material or an inorganic material, such as an inorganic photodiode, an organic photodiode, a perovskite photodiode, a phototransistor, a photogate, or a pinned photodiode.

Figure 3A:
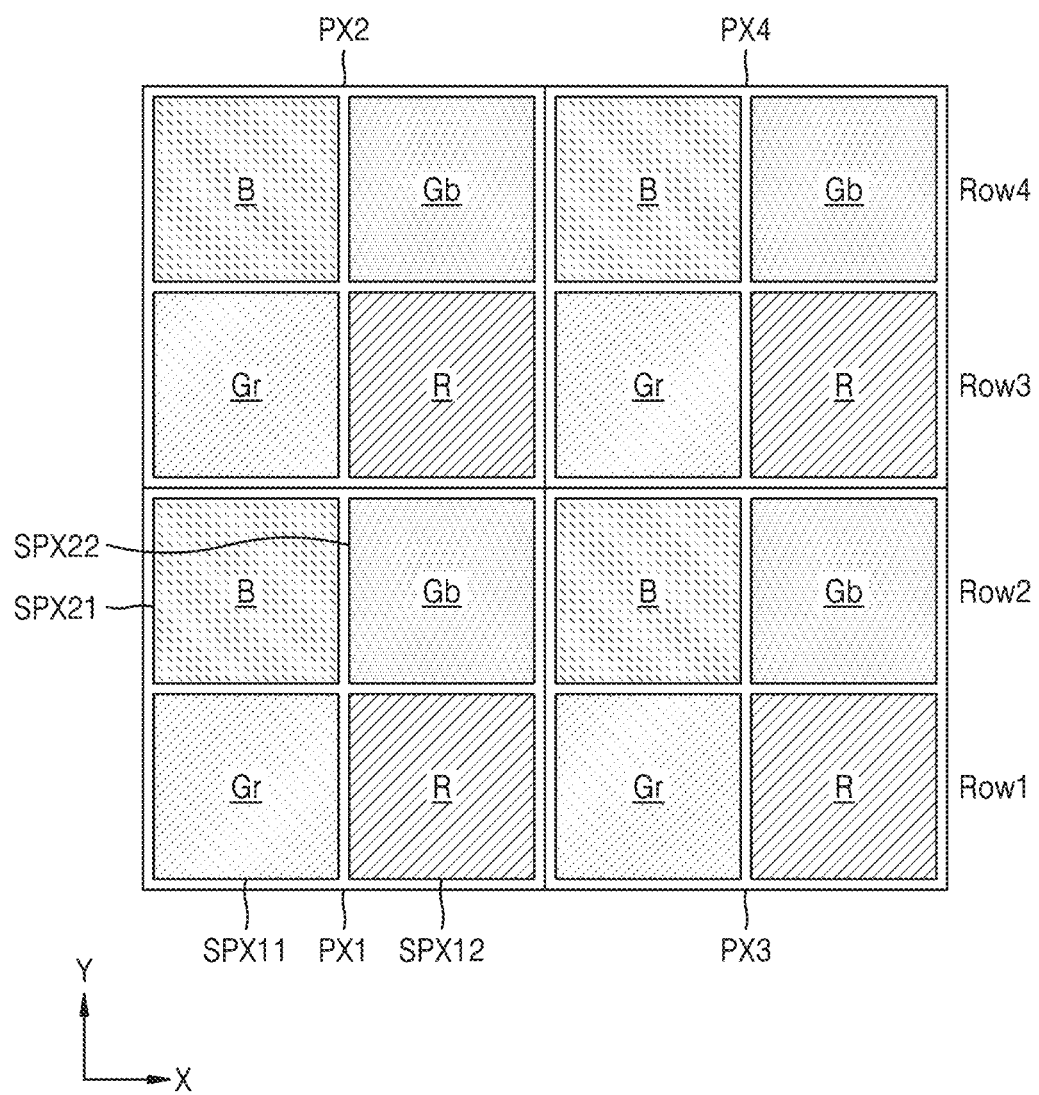
FIGS. 3A and 3B illustrate examples of a color pattern of a pixel array according to some example embodiments.

In the pixel array 110 according to some example embodiments, the pixels PX may have a shared pixel structure. The pixels PX may each include a plurality of sub-pixels sharing a floating diffusion node. The sub-pixels may include a photoelectric conversion element and a transfer transistor that transfers charges generated in the photoelectric conversion element to the floating diffusion node. As an example, the pixels PX may each include four sub-pixels (SPX11, SPX12, SPX21, and SPX22 of FIG. 3) arranged in a 2×2 matrix as illustrated in FIG. 3A. However, the inventive concepts are not limited thereto, and the pixel PX may include M×N sub-pixels arranged in an M×N matrix or an N×M matrix, where N is a positive integer greater than or equal to two, and M is a positive integer.

Accordingly, the pixel array 110 may include a plurality of sub-pixel rows, each sub-pixel row may include a plurality of sub-pixels consecutively arranged in a row direction, or each sub-pixel row may include a plurality of sub-pixel rows consecutively arranged in a row direction.

Hereinafter, in the inventive concepts, a 'row' refers to a sub-pixel row, and a row composed of pixels (or a row in which pixels are arranged) will be referred to as a 'pixel row'.

In some example embodiments, two adjacent pixels PX in a column direction (for example, PX1 and PX2 and PX3 and PX4 in FIG. 3A) may be connected to the same column line CL, and a reset order (or referred to as a shutter order) and a readout order of a plurality of sub-pixels included in the two pixels PX may be changed according to an exposure time setting value (that is, a set exposure time). The two pixels PX may alternately output a pixel signal generated in each sub-pixel. Here, reset of a sub-pixel refers to reset of a photoelectric conversion element provided in the sub-pixel. Before an exposure time, to remove charges generated in a photoelectric conversion element (for example, a photodiode) provided in a sub-pixel, a transfer transistor connected to the photoelectric conversion element may be turned on to reset the sub-pixel. When the transfer transistor is turned on, the charges generated in the photoelectric conversion element are transferred to a floating diffusion node, and then (or simultaneously), a reset voltage may be applied to the floating diffusion node to remove the charges. Readout of the sub-pixel may be performed by turning on the transfer transistor to transfer the charges generated in the photoelectric conversion element provided in the sub-pixel, to the floating diffusion node during the exposure time. A pixel voltage generated in response to the charges transferred to the floating diffusion node may be output to the ADC circuit 130 through a column line connected to the pixel. The exposure time (or called 'integration time') may refer to a period of time from when the transfer transistor is turned off after the transfer transistor is turned on to reset the sub-pixel, to when the transfer transistor is turned on again to read out the sub-pixel.

In a horizontal period in which one pixel PX among the two pixels PX, for example, a sub-pixel of a first pixel, is read out, for example, in a first horizontal period, the other pixel PX, for example, a sub-pixel of a second pixel may be reset. In the first horizontal period, other sub-pixels of the first pixel are reset or no pixel signal is read out. Also, in a second horizontal period after the first horizontal period, a pixel signal may be read from the sub-pixel of the second pixel, and another sub-pixel of the first pixel may be reset.

The row driver 120 may drive the pixel array 110. The row driver 120 may decode a row control signal (e.g., a row address) received from the timing controller 140, and select, in response to the decoded row control signal, at least one row line RL from among a plurality of row lines RL connected to the pixel array 110. Here, the row control signal may select at least one row among the plurality of rows included in the pixel array 110.

In some example embodiments, the row driver 120 may drive the pixel array 110 in units of two pixel rows. For example, the row driver 120 may receive, from the timing controller 140, a row control signal (e.g., a row address) indicating that a plurality of sub-pixels provided in the first pixel and the second pixel arranged adjacent to each other in a column direction are selected according to a set order, and may select, based on the row control signal, at least one row line from among a plurality of row lines connected to the pixel array 110.

The row driver 120 may generate, based on the row control signal, pixel control signals provided to each pixel, for example, a selection signal, a reset signal, and transfer control signals. A plurality of sub-pixels may be reset and read based on the selection signal, the reset signal, and the transfer control signals.

The pixel array 110 outputs a pixel signal, e.g., a pixel voltage, from each of the pixels PX included in at least one pixel row selected by a selection signal provided from the row driver 120. The pixel signal may include a reset signal indicating a voltage level in a state in which the floating diffusion node provided in the pixel is reset and an image signal indicating a voltage level according to an optical signal received by at least one sub-pixel.

The row driver 120 may transmit control signals for outputting a pixel signal, to the pixel array 110, and the pixel PX may operate in response to the control signals to output the pixel signal.

The ADC circuit 130 may convert pixel signals output from the pixel array 110 to pixel values that are digital signals. The ADC circuit 130 includes a plurality of analog-to-digital converters (ADCs), and each of the plurality of ADCs may convert a pixel signal to a pixel value by using a correlated double sampling (CDS) method. A pixel signal received through each of the plurality of column lines CL may be converted to a pixel value by a corresponding ADC among the plurality of ADCs.

The memory 160 may include a plurality of line buffers, and a plurality of pixel values generated by the ADC circuit 130 may be stored in the plurality of line buffers in units of rows.

The image converting circuit 150 may convert first image data including a plurality of pixel values output from the ADC circuit 130 and stored in the memory 160, to second image data having a same color pattern as a color pattern of the pixel array 110 (for example, a pattern of a color filter array on the pixel array 110). For example, the pixel array 110 may have a Bayer pattern, but as described above, as the readout order of a plurality of sub-pixels provided in two pixels PX in units of two pixels PX is changed, the first image data output from the ADC circuit 130 does not have a Bayer pattern. The image converting circuit 150 may access the memory 160 to convert the first image data to the second image data of a Bayer pattern.

The timing controller 140 outputs a control signal to each of the row driver 120, the ADC circuit 130, and the image converting circuit 150, and may control an operation and an operation timing of each of the row driver 120, the ADC circuit 130, and the image converting circuit 150.

In some example embodiments, the timing controller 140 may change (or adjust) a reset order and a readout order of a plurality of sub-pixels provided in two adjacent pixels PX in a column direction according to an exposure time setting value, and generate row addresses according to the changed order. The timing controller 140 may set an exposure time between reset and read out of a sub-pixel according to an exposure time setting value. Here, the timing controller 140 may change the reset order and the readout order of the plurality of sub-pixels such that in a horizontal period in which a pixel signal is read out from one sub-pixel included in one pixel, a pixel signal is not read from another sub-pixel included in the same pixel or other sub-pixels are not reset. The timing controller 140 may change the reset order and the readout order of the plurality of sub-pixels such that the sub-pixel of the second pixel is reset in a horizontal period in which the sub-pixel of the first pixel among the two pixels PX is read out. The timing controller 140 may change the reset order and the readout order of the plurality of sub-pixels included in two pixels PX such that the reset of the sub-pixel and the readout of the sub-pixel are alternately performed in the two pixels PX. As described above, changes in the reset order and the readout order of the plurality of sub-pixels according to an exposure time setting value will be described in detail with reference to FIGS. 5 to 12C.

The image signal processor 170 may perform various signal processing on image data provided from the image converting circuit 150, for example, the second image data. For example, the image signal processor 170 may perform signal processing such as image quality compensation, binning, and/or downsizing, on received image data, and the image quality compensation may include, for example, black level compensation, lens shading compensation, crosstalk compensation, and/or bad pixel correction.

Image data output from the image signal processor 170 may be transmitted to an external processor. For example, the external processor may include a host processor of an electronic device in which the image sensor 100 is mounted. For example, the external processor may include an application processor of a mobile terminal. The image sensor 100 may transmit image data to an external processor according to a data communication method based on a set interface, for example, a Mobile Industry Processor Interface (MIPI).

As described above, according to the image sensor 100 according to some example embodiments, the pixel array 110 has a shared pixel structure, and change the reset order (or referred to as 'shuttering order') and the readout order of a plurality of sub-pixels included in two pixels PX such that the reset of the sub-pixels and the readout of the sub-pixels are alternately performed in the two pixels PX, in units of two pixels according to an exposure time setting value. As described above, as the reset of the sub-pixels and the readout of the sub-pixel are alternately performed in the two pixels PX, a range of a settable exposure time may be increased and a minimum exposure time may be set. Accordingly, the restrictions on exposure time setting due to the shared pixel structure may be overcome, and a dynamic range of the image sensor 100 may be increased even in a super high light environment.

Figure 2A:
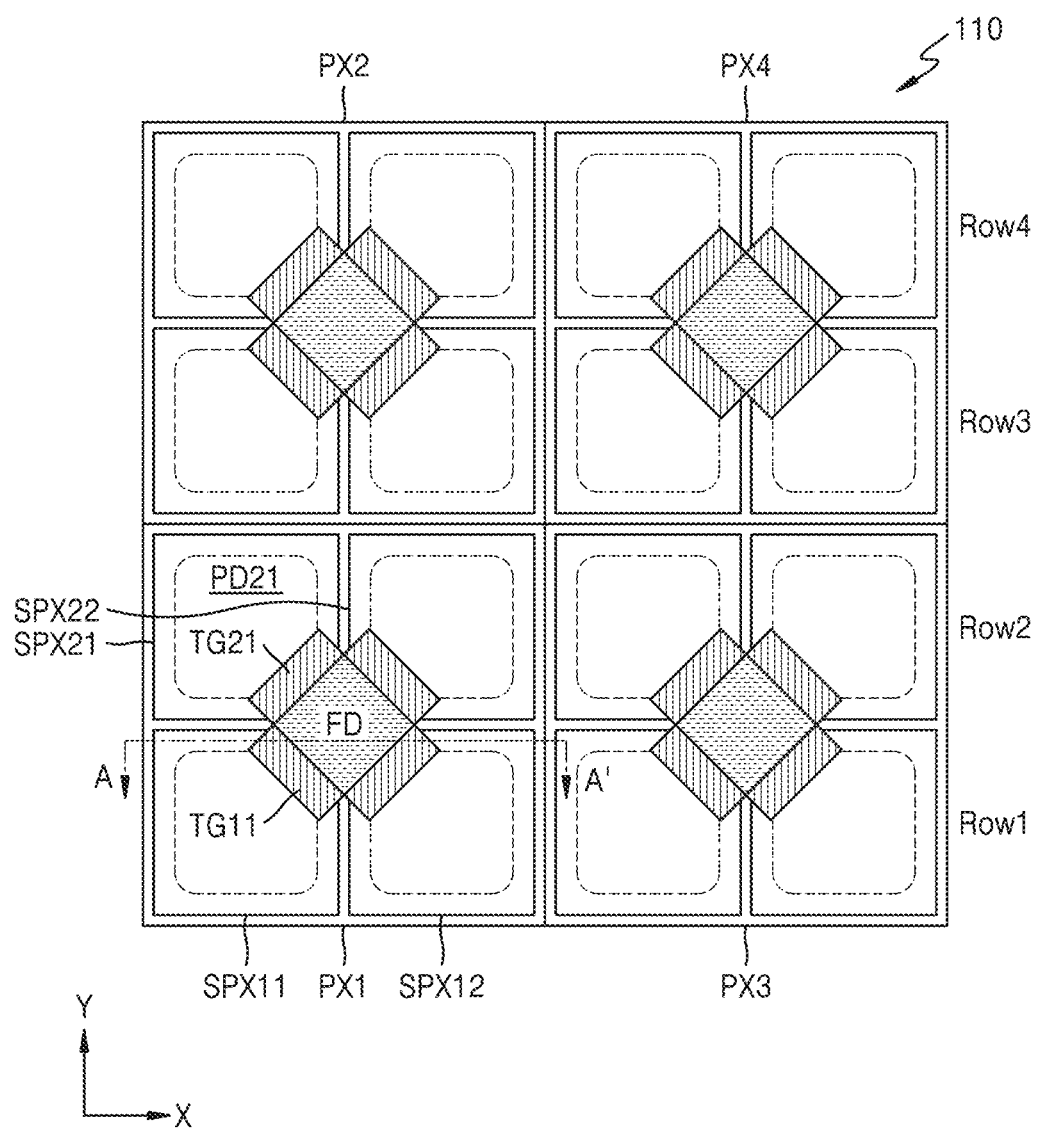
FIG. 2A is a plan view illustrating an example of a pixel array according to some example embodiments.
Figure 2B:
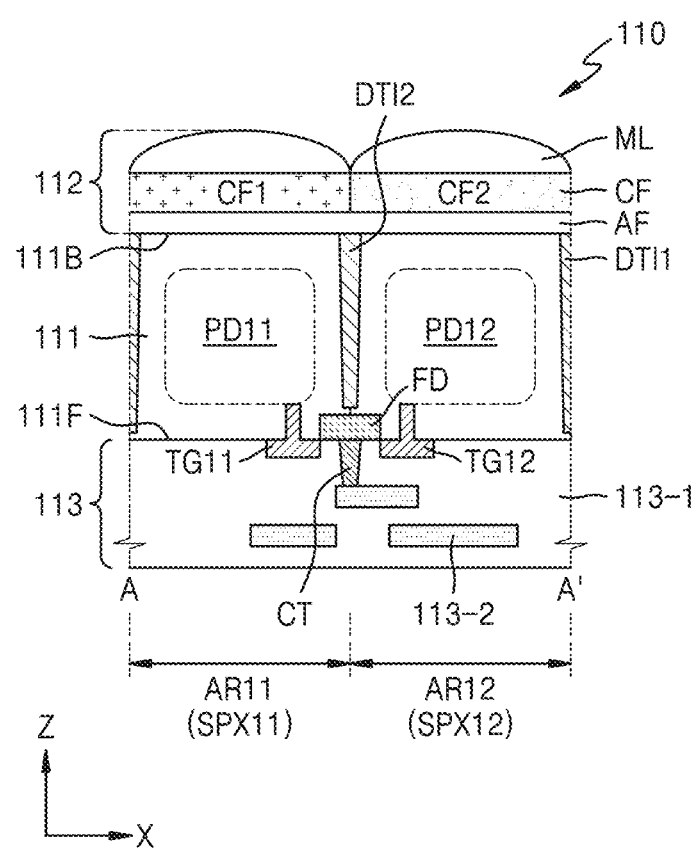
FIG. 2B is a vertical cross-sectional view of a pixel array according to some example embodiments.

FIG. 2A is a plan view illustrating an example of a pixel array according to some example embodiments, and FIG. 2B is a vertical cross-sectional view of a pixel array according to some example embodiments.

Referring to FIG. 2A, the pixel array 110 may include a plurality of pixels arranged in a matrix, for example, first to fourth pixels PX1, PX2, PX3, and PX4. While four pixels are illustrated for convenience of description, the pixel array 110 may include a larger number of pixels, and the number of pixels may be determined according to the resolution of the pixel array 110.

The first pixel PX1 may include first to fourth sub-pixels SPX11, SPX12, SPX21, and SPX22 that share a floating diffusion node FD, and the first to fourth sub-pixels SPX11 and SPX12, SPX21, and SPX22 may each include a photoelectric conversion element, for example, a photodiode PD, and a transfer gate TG. The transfer gate TG is a gate of a transfer transistor. The second to fourth pixels PX2, PX3, and PX4 may have the same structure as the first pixel PX1.

Sixteen sub-pixels included in the first to fourth pixels PX1, PX2, PX3, and PX4 may be arranged in a 4×4 matrix, and as illustrated, the sub-pixels may be arranged in first to fourth rows Row1, Row2, Row3, and Row4.

As described with reference to FIG. 1, two adjacent pixels in a second direction (or referred to as a 'column direction'), for example, a Y-axis direction, such as the first pixel PX1 and the second pixel PX2, and the third pixel PX3 and the fourth pixel PX4 may be connected to the same column line (CL of FIG. 1). A reset order and a readout order of eight sub-pixels included in two pixels, for example, the first pixel PX1 and the second pixel PX2, may be changed according to an exposure time setting value. Accordingly, the two pixels may alternately output a pixel signal generated in a sub-pixel.

A vertical cross-sectional view taken along line A-A' is illustrated in FIG. 2B. Referring to FIG. 2B, the pixel array 110 may include a semiconductor substrate 111 (hereinafter referred to as a 'substrate') having a first surface 111B and a second surface 111F facing each other, an incident layer 112 arranged on the first surface 111B of the substrate 111, and a wiring layer 113 (or referred to as a 'wiring structure') arranged on the second surface 111F of the substrate 111.

A first deep trench isolation (DTI) DTI1 and a second DTI DTI2 may be arranged in the substrate 111. The first DTI DTI1 may pass through the substrate 111 from the first surface 111B to the second surface 111F. The second DTI DTI2 may extend from the first surface 111B toward the second surface 111F, but may be spaced apart from the second surface 111F. The first DTI DTI1 and the second DTI DTI2 may prevent or reduce cross-talk between pixels and between sub-pixels.

A first photoelectric conversion element PD11 may be arranged in a first area AR11 of the first sub-pixel SPX1, and a second photoelectric conversion element PD12 may be arranged in a second area AR12 of the second sub-pixel SPX2.

The first surface 111B of the substrate 111 may be an incident surface of light, and light may be incident through the incident layer 112 and the first surface 111B. The incident layer 112 may include a micro lens ML and a color filter CF. In some example embodiments, an anti-reflection layer AF may be arranged between the first surface 111B of the substrate 111 and the color filter CF.

The color filter CF may transmit through light of a certain frequency band, that is, light of a certain color. A plurality of color filters CF may configure a color filter array. In some example embodiments, the color filter array may have a Bayer pattern. However, the inventive concepts are not limited thereto, and the color filter array may have a different arrangement. The plurality of color filters may include a red filter, a blue filter, and two green filters, and the red filter, the blue filter, and the two green filters may be arranged in a 2×2 matrix, wherein the two green filters may be arranged diagonally. In some example embodiments, the plurality of color filters CF may include a red filter, a blue filter, a green filter, and a white filter, which are arranged 2×2. In some example embodiments, the plurality of color filters CF may include a red filter, two yellow filters, and a blue filter arranged 2×2, and the two yellow filters may be arranged diagonally. However, the inventive concepts are not limited thereto, and the plurality of color filters may include filters combined with different colors. For example, the plurality of color filters may include a yellow filter, a cyan filter, and a green filter.

A first color filter CF1 may be arranged on the first sub-pixel SPX11, and a second color filter CF2 may be arranged on the second sub-pixel SPX12. The first color filter CF1 and the second color filter CF2 may transmit light of the same color or different colors. A color detectable by a corresponding sub-pixel (the first sub-pixel SPX11 or the second sub-pixel SPX12) may be determined according to a color of light transmitted by the color filter CF.

The floating diffusion node FD may be formed adjacent to the second surface 111F of the substrate 111, and may be located at a center between sub-pixels, for example, the first sub-pixel SPX11 and the second sub-pixel SPX12. The floating diffusion node FD may be a region doped with impurities of a second conductivity type.

A gate of a transistor, for example, a first transfer gate TG11 and a second transfer gate TG12, may be formed in the wiring layer 113, adjacent to the second surface 111F of the substrate 111. A well region (not shown) may be formed around the first transfer gate TG11 and the second transfer gate TG12. The well region may be formed adjacent to the second surface 111F in the substrate 111. The well region may act as a drain and a source of a transistor. The first transfer gate TG11 and the second transfer gate TG12 may be formed adjacent to the floating diffusion node FD. As illustrated, the first transfer gate TG11 and the second transfer gate TG12 may share the floating diffusion node FD.

Figure 3B:
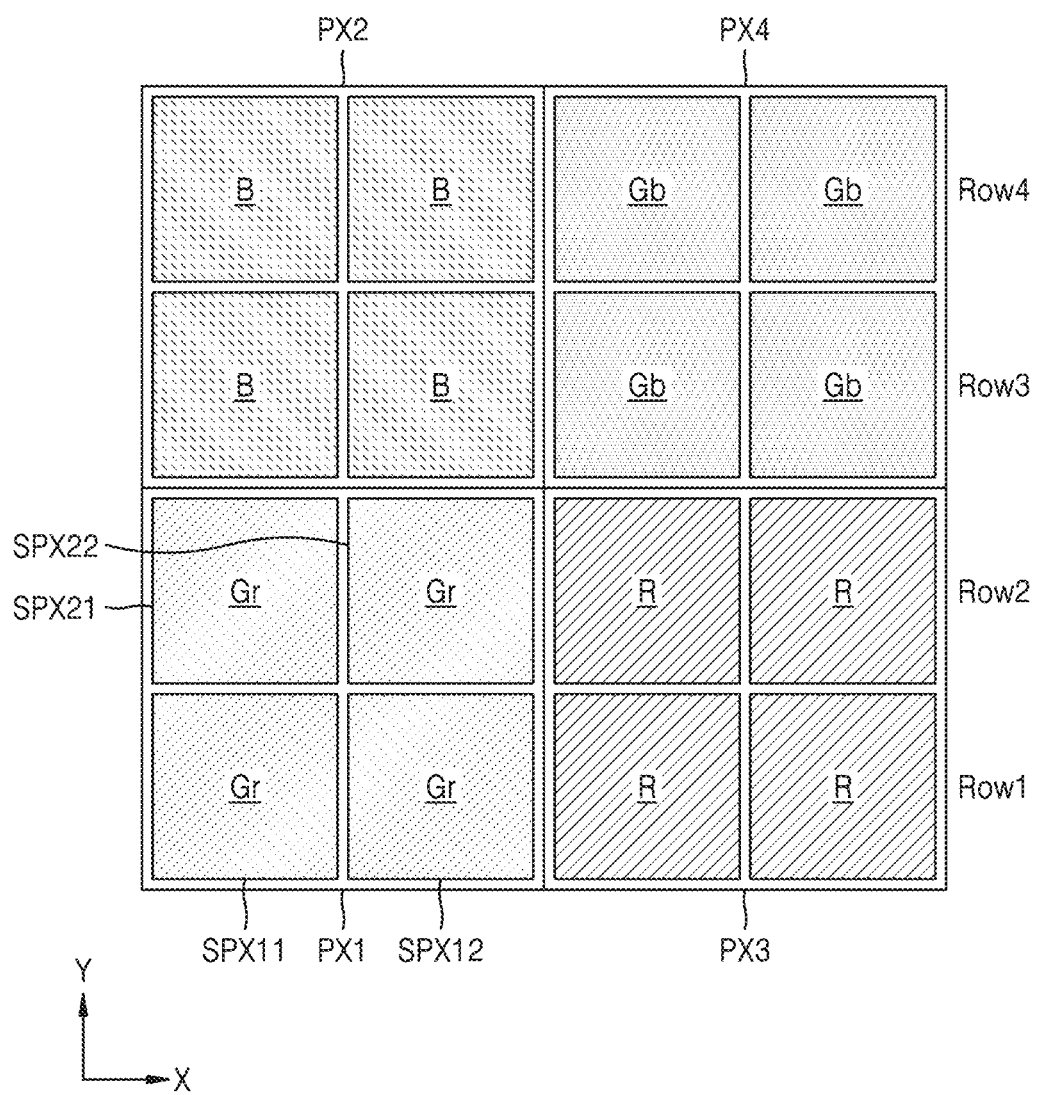

FIGS. 3A and 3B illustrate examples of a color pattern of a pixel array according to some example embodiments.

Referring to FIG. 3A, the pixel array (110 of FIG. 1) may have a Bayer pattern. The Bayer pattern may refer to a pattern in which pixels are arranged such that green is 50% and red and blue are each 25%, to suit human visual characteristics. A plurality of pixels included in the pixel array 110, for example, the first to fourth pixels PX1, PX2, PX3, and PX4, may each include the first to fourth sub-pixels SPX11, SPX12, SPX21, and SPX22 arranged in a 2×2 matrix. Each of the first to fourth pixels PX1, PX2, PX3, and PX4 may include a first green sub-pixel Gr, a red sub-pixel R, a blue sub-pixel B, and a second green sub-pixel Gb. As described with reference to FIG. 2B, a color of a sub-pixel may be determined by a color of the light transmitted by a color filter arranged above each sub-pixel (e.g., a frequency band of an optical signal transmitted by the color filter).

Referring to FIG. 3B, the pixel array 110 may have a tetra pattern. Each of the first to fourth pixels PX1, PX2, PX3, and PX4 arranged in a 2×2 matrix may include the first to fourth sub-pixels SPX11, SPX12, SPX21, and SPX22 each having the same color. The first pixel PX1 may include four first green sub-pixels Gr, the second pixel PX2 may include four blue sub-pixels B, the third pixel PX3 may include four red sub-pixels R, and the fourth pixel PX4 may include four second green sub-pixels Gb.

Figure 4:
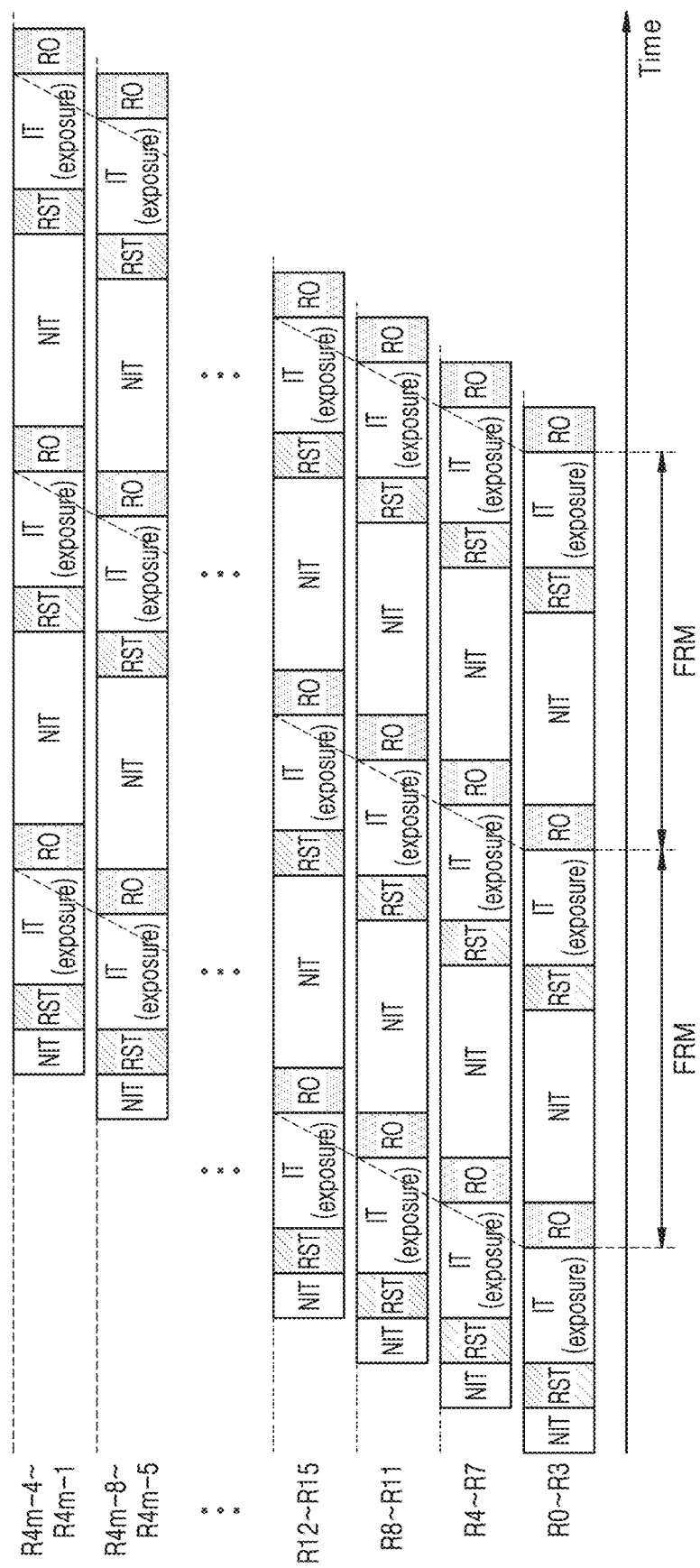
FIG. 4 is a timing diagram illustrating an operation of a rolling shutter of a pixel array, according to some example embodiments.

FIG. 4 is a timing diagram illustrating an operation of a rolling shutter of a pixel array, according to some example embodiments.

Referring to FIG. 4, the pixel array (110 of FIG. 1) may operate according to a rolling shutter method. The pixel array 110 may include a plurality of rows, for example, first to 4m-th rows R0 to R4m−1 (m is a positive integer), and each of the plurality of rows may include a plurality of sub-pixels. The first to 4m-th rows R0 to R4m−1 may be sequentially arranged in the pixel array 110. For example, the first row R0 is arranged at the topmost (or bottommost) portion in the pixel array 110 and the 4m-th row R4m−1 may be arranged at the bottommost (or at the topmost) portion in the pixel array 110.

In some example embodiments, a plurality of sub-pixels provided in a plurality of rows may not be simultaneously reset (shuttered), but may be sequentially reset in units of at least one row.

For each of a plurality of rows during one frame FRM, a non-integration time NIT, a reset time RST, an exposure time IT (also referred to as an integration time) and a readout time RO may be assigned. A time point from the start of a readout time RO to the start of a next readout time RO may be defined as one frame FRM. An initial non-integration time NIT, an initial reset time RST, and an initial exposure time IT may be referred to as a shutter frame.

A sub-pixel may be reset during the reset time RST. A transfer transistor provided in a sub-pixel may be turned on to transfer charges generated in a photodiode to a floating diffusion node during the non-integration time NIT, thereby removing the charges. In some example embodiments, as the transfer transistor of the sub-pixel is turned on while a reset voltage is applied to the floating diffusion node, the floating diffusion node and the sub-pixel may be reset together. During the exposure time IT, charges according to an optical signal may be generated and accumulated in the photodiode provided in the sub-pixel. The sub-pixel may be read out during at the readout time RO. In other words, the transfer transistor provided in the sub-pixel may be turned on during the readout time RO such that the charges accumulated in the photodiode during the exposure time IT are transferred to the floating diffusion node and a pixel voltage corresponding to the transferred charges is output through a column line (CL in FIG. 1).

As described with reference to FIGS. 3A and 3B, two adjacent pixels in a column direction may be arranged in four rows. In other words, two pixel rows may include four rows (e.g., four sub-pixel rows). Reset and readout of sub-pixels may be alternately performed with respect to two pixels. Accordingly, as illustrated in FIG. 4, the reset time RST, the exposure time IT, the readout time RO, and non-integration time NIT may be respectively sequentially started in units of four adjacent rows according to an arrangement order in in which a plurality of rows, for example, the first to 4m-th rows R0 to R4m−1, are arranged in the pixel array 110. The order in which the reset time (RST), exposure time (IT), readout time (RO), and non-integration time (NIT) of each row are respectively stated within the four rows does not depend on the order in which the four rows are arranged, but may be changed according to an exposure time setting value.

While an example in which two pixels are arranged in four rows is described with reference to FIG. 4, the inventive concepts are not limited thereto, and when pixels include sub-pixels arranged in an N×N matrix, two pixels may be arranged in 2N rows, and within the 2N rows, an order in which the reset time RST, the exposure time IT, the readout time RO, and the non-integration time NIT of each row start may be changed according to an exposure time setting value.

Figure 5:
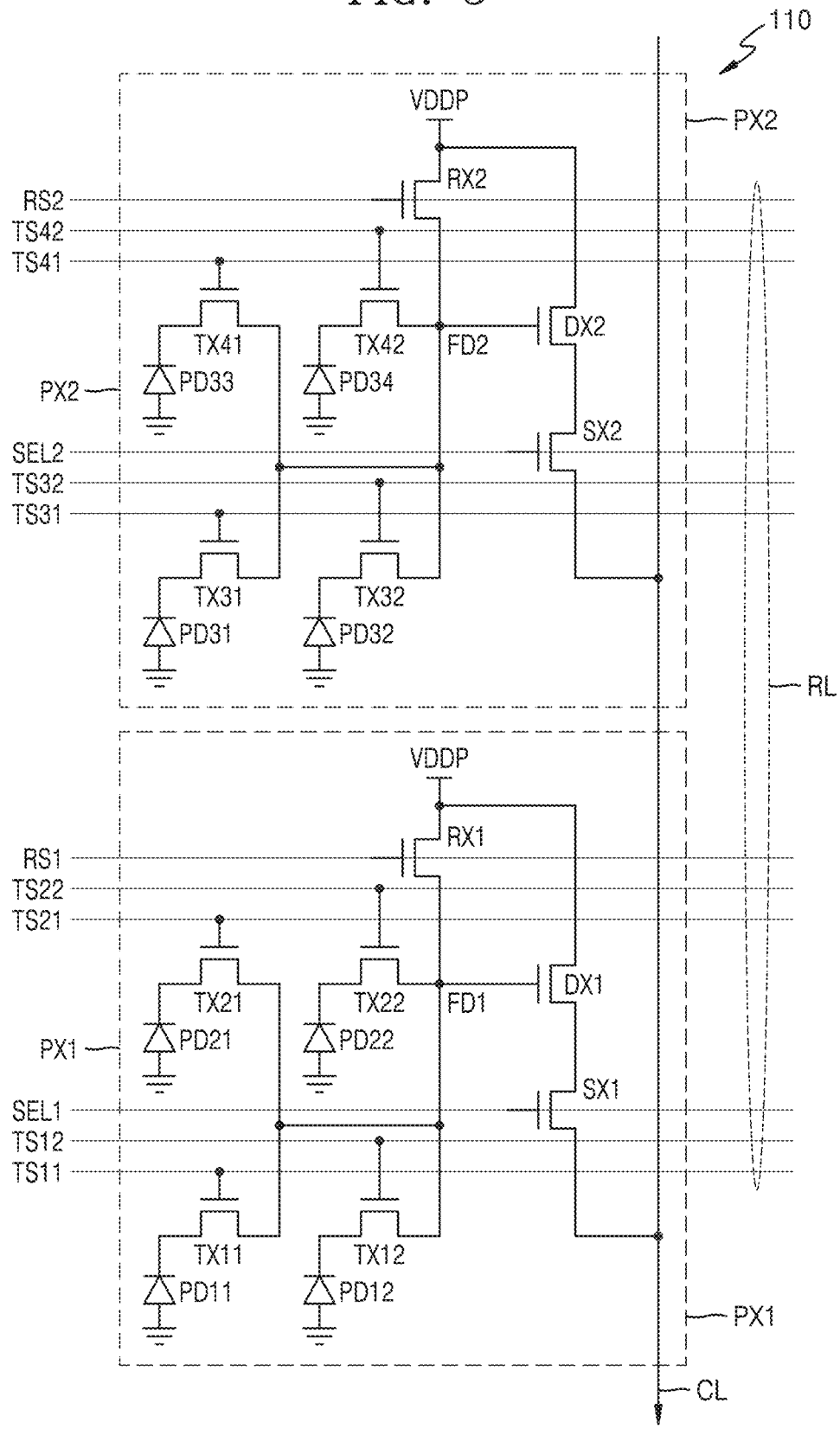
FIG. 5 is a circuit diagram illustrating pixels and a pixel array, according to some example embodiments.

FIG. 5 is a circuit diagram illustrating pixels and a pixel array, according to some example embodiments; For convenience of description, the first pixel PX1 and the second pixel PX2 connected to the same column line CL are illustrated.

Referring to FIG. 5, the first pixel PX1 may include the first to fourth photoelectric conversion elements PD11, PD12, PD21, and PD22 and first to fourth transfer transistors TX11, TX12, TX21 and TX22 which are respectively connected thereto, a reset transistor RX1, a driving transistor DX1, and a selection transistor SX1. One photoelectric conversion element and one transfer transistor may constitute one sub-pixel. Accordingly, the first pixel PX1 may include four sub-pixels. The four sub-pixels may share a floating diffusion node FD1, the reset transistor RX1, the driving transistor DX1, and the selection transistor SX1.

Pixel control signals received through the row lines RL, for example, first to fourth transfer control signals TS11, TS12, TS21, and TS22, a reset signal RS1, and a selection signal SEL1, may be respectively applied to gates of the first to fourth transfer transistors TX11, TX12, TX21, and TX22, the reset transistor RX1, and the selection transistor SX1.

The reset transistor RX1 may be turned on in response to the reset signal RS1 to apply a power supply voltage VDDP to the floating diffusion node FD1 as a reset voltage to thereby reset the floating diffusion node FD1. In other words, the reset transistor RX1 may be turned on to remove charges accumulated in the floating diffusion node FD1.

The driving transistor DX1 may generate a pixel signal (e.g., a pixel voltage) corresponding to an electric potential of the floating diffusion node FD1. The selection transistor SX1 may be turned on in response to the selection signal SEL1 during the readout time of the first pixel PX1 to transmit ta pixel signal to the column line CL. In detail, the selection transistor SX1 may be turned on during a readout time of each of the four sub-pixels included in the first pixel PX1 to output, as pixel signals to the column line CL, an image signal corresponding to a reset level of the floating diffusion node FD1 in a reset state and charges generated in a corresponding sub-pixel. A pixel signal corresponding to the reset level of the floating diffusion node FD1 may be output to the column line CL before a transfer transistor of the corresponding sub-pixel is turned on during the readout time, and a pixel signal corresponding to the image signal may be output as a pixel signal when the transfer transistor is turned on and then turned off. The first to fourth transfer transistors TX11, TX12, TX21, and TX22 may be respectively turned on in response to the first to fourth transfer control signals TS11, TS12, TS21, and TS22 which have an active level (e.g., logic high) before an exposure time to reset the first to fourth photoelectric conversion elements PD11, PD12, PD21, and PD22, and may be respectively turned on in response to the first to fourth transfer control signals TS11, TS12, TS21, and TS22 which have an active level after the exposure time, and transmit charges generated in the first to fourth photoelectric conversion elements PD11, PD12, PD21, and PD22 to the floating diffusion node FD1 during the exposure time. Here, times when the first to fourth transfer control signals TS11, TS12, TS21, and TS22 have an active level, that is, a time when the first to fourth transfer transistors TX11, TX12, TX21, and TX22 are turned on, may be different from each other.

The second pixel PX2 may include first to fourth photoelectric conversion elements PD31, PD32, PD41, and PD42, and fifth to eighth transfer transistors TX31, TX32, TX41, and TX42 respectively connected thereto, and a reset transistor RX2, a driving transistor DX2, and a selection transistor SX2. Control signals for driving pixels received through the row lines RL, for example, fifth to eighth transfer control signals TS31, TS32, TS41, and TS42, a reset signal RS2, and a selection signal SEL2 may be applied to gates of the fifth to eighth transfer transistors TX31, TX32, TX41, and TX42, the reset transistor RX2, and the selection transistor SX2. Since the configuration and operation of the second pixel PX2 are the same as those of the first pixel PX1, repeated description will be omitted.

The first pixel PX1 and the second pixel PX2 have a shared pixel structure in which a plurality of sub-pixels share the floating diffusion node FD1 or a floating diffusion node FD2. When a rolling shutter method is applied to the pixel array 110 having a shared pixel structure as described above, other sub-pixels cannot be reset or read into other sub-pixels during a horizontal period in which one sub-pixel is read from within the same pixel. Accordingly, there may be restrictions on the setting of a minimum exposure time of the pixel array 110.

However, in the image sensor (100 of FIG. 1) according to some example embodiments, two pixels connected to one column line CL, for example, the first pixel PX1 and the second pixel PX2, may operate as one readout unit, and in order that the first pixel PX1 and the second pixel PX2 may alternately perform a reset operation of sub-pixels and a readout operation of sub-pixels, the reset order and the readout order of the eight sub-pixels included in the first pixel PX1 and the second pixel PX2 may be changed according to an exposure time setting value. Accordingly, a minimum exposure time may be set (or, alternatively, the minimum exposure time may be determined or desired in relation to the above methods). This will be described in detail with reference to FIGS. 6 to 8D.

Figure 6:
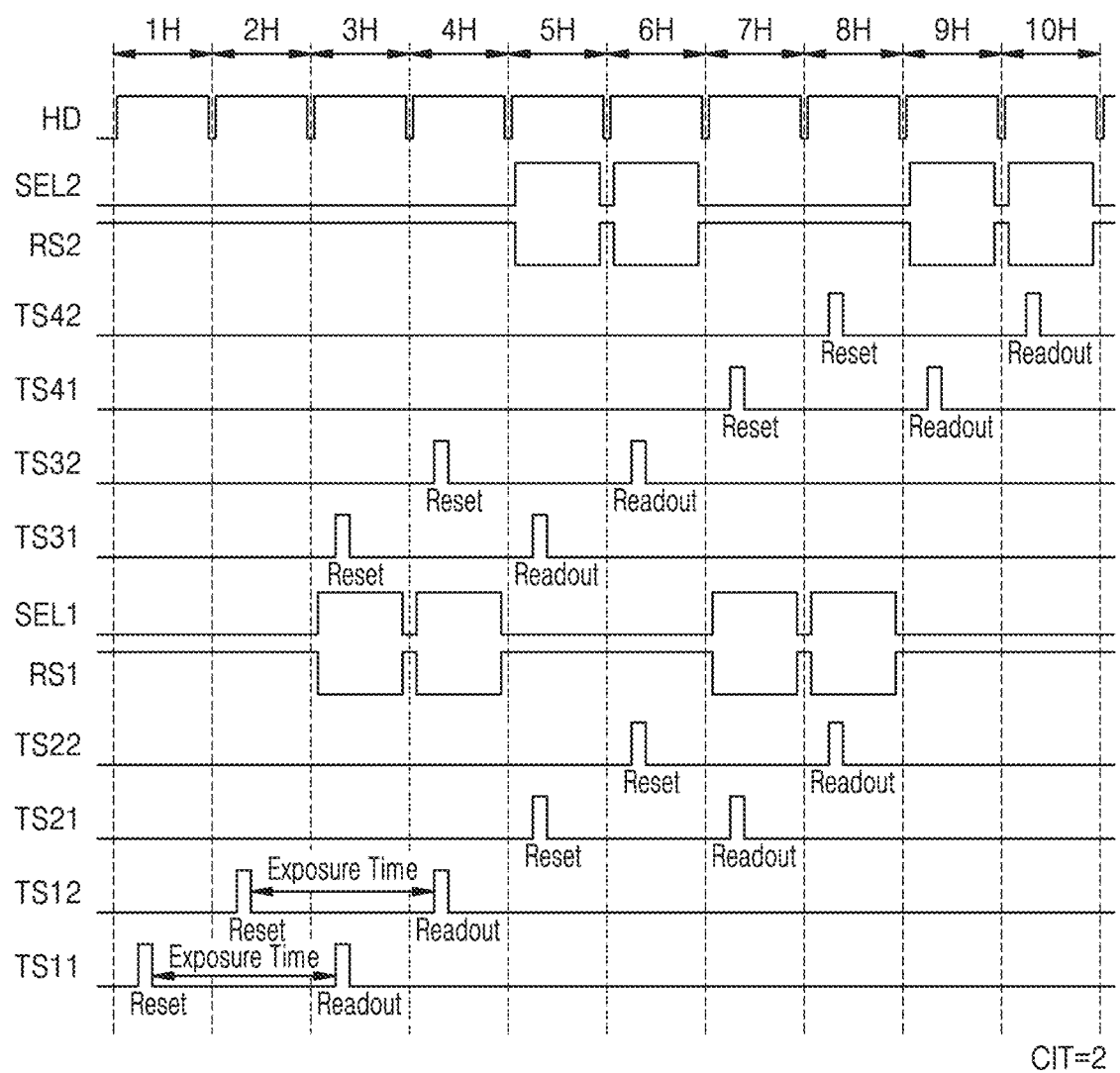
FIG. 6 is a timing diagram of control signals provided to a pixel array, according to some example embodiments.

FIG. 6 is a timing diagram of control signals provided to a pixel array, according to some example embodiments.

An exposure time setting value, for example, a Coarse Integration Time (CIT) is set to 2, and accordingly, a time corresponding to approximately two horizontal periods may be set as an exposure time. Here, a horizontal period is a period in which a pixel signal output from the pixel array (110 of FIG. 1) is converted to a pixel value that is a digital signal, and may be distinguished by a horizontal synchronization signal HD. For example, a period from a rising edge of the horizontal synchronization signal HD to a next rising edge thereof may be defined as one horizontal period. For example, the horizontal synchronization signal HD may be generated by the timing controller (140 of FIG. 1) and provided to the ADC circuit (130 of FIG. 1) and the row driver 120.

Referring to FIGS. 5 and 6, in a first horizontal period 1H and a second horizontal period 2H, the first selection signal SEL1 and the second selection signal SEL2 have an inactive level (e.g., logic low), and the first reset signal RS1 and the second reset signal RS2 may have an active level (e.g., logic high). Accordingly, the selection transistors SX1 and SX2 of the first pixel PX1 and the second pixel PX2 may be turned off, and the reset transistors RX1 and RX2 may be turned on.

In the first horizontal period 1H, a pulse signal may be applied to the first transfer transistor TX11 as the first transfer control signal TS11, and accordingly, a first sub-pixel of the first pixel PX1, specifically, the first photoelectric conversion element PD11, may be reset. The pulse signal may be referred to as a reset control signal.

In the second horizontal period 2H, a pulse signal (that is, a reset control signal) may be applied to the second transfer transistor TX12 as the second transfer control signal TS12, and accordingly, a second sub-pixel of the first pixel PX, specifically, the second photoelectric conversion element PD12, may be reset.

In a third horizontal period 3H and a fourth horizontal period 4H, the second reset signal RS2 may have an inactive level, and accordingly, the reset transistor RX1 of the first pixel PX1 may be turned off. The first selection signal SEL1 of an active level may be applied to the selection transistor SX1 of the first pixel PX1, and as the selection transistor SX1 is turned on, a pixel signal from the first pixel PX1 may be provided to the column line CL.

In the third horizontal period 3H, the first sub-pixel of the first pixel PX1 may be read out. A pulse signal may be applied to the first transfer transistor TX11 as the first transfer control signal TS11 to turn on the first transfer transistor TX11. The pulse signal may be referred to as a readout control signal. During an exposure time from after the first transfer transistor TX11 is turned off in the first horizontal period 1H and until the first transfer transistor TX11 is turned on again in the third horizontal period 3H, charges generated and accumulated in the first photoelectric conversion element PD11 may be provided to the floating diffusion node FD1, and a pixel signal corresponding to an electric potential of the floating diffusion node FD1, that is, a pixel signal from the first sub-pixel (e.g., an image signal), may be output to the column line CL. Although not shown, before the first transfer transistor TX11 is turned on, a reset level of the floating diffusion node FD1 may be output as a pixel signal to the column line CL, and also when other sub-pixel are read out, before a corresponding transfer transistor is turned on, a reset level of a floating diffusion node to which the sub-pixels are connected, may be output as a pixel signal to the column line CL.

As illustrated in FIG. 6, as a pulse signal of an active level may be provided to the reset transistor RX11 of the first pixel PX1 as the first reset signal RS1 at the end of the third horizontal period 3H and/or at the beginning of the fourth horizontal period 4H, the floating diffusion node FD1 of the first pixel PX1 may be reset. Thereafter, a second sub-pixel of the first pixel PX1 may be read out in the fourth horizontal period 4H. As a pulse signal is applied to the second transfer transistor TX12 as the second transfer control signal TS12 to turn on the second transfer transistor TX12, a pixel signal of the second sub-pixel may be read out. During an exposure time from after the second transfer transistor TX12 is turned off in the second horizontal period 2H and until the second transfer transistor TX12 is turned on again in the fourth horizontal period 4H, charges generated and accumulated in the second photoelectric conversion element PD12 may be provided to the floating diffusion node FD1, and a pixel signal corresponding to an electric potential of the floating diffusion node FD1, that is, a pixel signal from the second sub-pixel, may be output to the column line CL.

Hereinafter, the description of reset and readout of the first sub-pixel of the first pixel PX1 and the second sub-pixel of the first pixel PX1 provided above may apply to reset and readout of other sub-pixels. An exposure time of each sub-pixel may be a period of time from when a corresponding transfer transistor is turned on to reset the sub-pixel and then turned off, to when the transfer transistor is turned on again to read out the sub-pixel, and exposure times of a plurality of sub-pixels are substantially equal.

Meanwhile, in the third horizontal period 3H, a pulse signal may be applied to the fifth transfer transistor TX31 as the fifth transfer control signal TS31, and accordingly, a fifth sub-pixel of the second pixel PX2, specifically, the fifth photoelectric conversion element PD31, may be reset. Also, in the fourth horizontal period 4H, a pulse signal may be applied to the sixth transfer transistor TX32 as the sixth transfer control signal TS32, and accordingly, a sixth sub-pixel of the second pixel PX2, specifically, the sixth photoelectric conversion element PD32, may be reset.

In a fifth horizontal period 5H and a sixth horizontal period 6H, the first selection signal SEL1 and the second reset signal RS2 may have an inactive level, and the second selection signal SEL2 and the first reset signal RS1 may have an active level. Accordingly, the selection transistor SX2 of the second pixel PX2 may be turned on, and a pixel signal from the second pixel PX2 may be provided to the column line CL. In the fifth horizontal period 5H, a pulse signal may be applied to the fifth transfer transistor TX31 as the fifth transfer control signal TS31, and the fifth sub-pixel of the second pixel PX2 may be read out.

As a pulse signal of an active level is provided to the reset transistor RX2 of the second pixel PX2 as the second reset signal RS2 at the end of the fifth horizontal period 5H and/or at the beginning of the sixth horizontal period 4H, the floating diffusion node FD2 of the second pixel PX2 may be reset. Next, in the sixth horizontal period 6H, a pulse signal may be applied to the sixth transfer transistor TX32 of the second pixel PX2 as the sixth transfer control signal TS32, and the sixth sub-pixel may be read out. In the fifth horizontal period 5H, a pulse signal may be applied to the third transfer transistor TX21 as the third transfer control signal TS21, and accordingly, a third sub-pixel of the first pixel PX1, specifically, the third photoelectric conversion element PD21 may be reset. In addition, in the sixth horizontal period 6H, a pulse signal may be applied to the fourth transfer transistor TX22 as the fourth transfer control signal TS22, and accordingly, a fourth sub-pixel of the first pixel PX1, specifically, the fourth photoelectric conversion element PD22, may be reset.

In a seventh horizontal period 7H and an eighth horizontal period 8H, the first selection signal SEL1 and the second reset signal RS2 may have an active level, and the second selection signal SEL2 and the first reset signal RS1 may have an inactive level. Accordingly, the selection signal SEL1 of an active level of the first pixel PX1 may be applied again to the selection transistor SX1 of the first pixel PX1, and as the selection transistor SX1 is turned on, a pixel signal from the first pixel PX1 may be provided to the column line CL. In the seventh horizontal period 7H, a pulse signal may be applied to the third transfer transistor TX21 as the third transfer control signal TS21, and the third sub-pixel may be read out.

As a pulse signal of an active level is provided to the reset transistor RX21 of the first pixel PX1 as the first reset signal RS1 at the end of the seventh horizontal period 7H and/or at the beginning of the eighth horizontal period 8H, the floating diffusion node FD1 of the first pixel PX1 may be reset. Thereafter, in the eighth horizontal period 8H, a pulse signal may be applied to the fourth transfer transistor TX22 as the fourth transfer control signal TS22, and a fourth sub-pixel of the first pixel PX1 may be read out.

In the seventh horizontal period 7H, a pulse signal may be applied to the seventh transfer transistor TX41 as the seventh transfer control signal TS41, and accordingly, a seventh sub-pixel of the second pixel PX2, specifically, the seventh photoelectric conversion element PD41, may be reset. Also, in the eighth horizontal period 8H, a pulse signal may be applied to the eighth transfer transistor TX42 as the eighth transfer control signal TS42, and accordingly, an eighth sub-pixel of the second pixel PX2, specifically, the eighth photoelectric conversion element PD42, may be reset.

In a ninth horizontal period 9H and a tenth horizontal period 10H, the first selection signal SEL1 and the second reset signal RS2 may have an inactive level, and the second selection signal SEL2 and the first reset signal RS1 may have an active level. Accordingly, the selection transistor SX2 of the second pixel PX2 may be turned on, and a pixel signal from the second pixel PX2 may be provided to the column line CL. In the ninth horizontal period 9H, a pulse signal may be applied to the seventh transfer transistor TX41 as the seventh transfer control signal TS41, and the seventh sub-pixel of the second pixel PX2 may be read out.

As a pulse signal of an active level may be provided to the reset transistor RX2 of the second pixel PX2 as the second reset signal RS2 at the end of the ninth horizontal period 9H and/or at the beginning of the tenth horizontal period 10H, the floating diffusion node FD2 of the second pixel PX2 may be reset. Thereafter, in the tenth horizontal period 10H, a pulse signal may be applied to the eighth transfer transistor TX42 as the eighth transfer control signal TS42, and the eighth sub-pixel of the second pixel PX2 may be read out.

Meanwhile, in some example embodiments of FIG. 6, when the sub-pixel is reset, that is, when the transfer transistor provided in the sub-pixel is turned on based on a transfer control signal of an active level, a selection signal having an inactive level and a reset signal having an active level are illustrated. For example, in the first horizontal period 1H, when the first transfer control signal TS11 is at an active level, the first selection signal SEL1 is illustrated as maintaining an inactive level, and the first reset signal RS1 is illustrated as maintaining an active level.

However, the inventive concepts are not limited thereto, and in some example embodiments, when a sub-pixel is reset, a reset signal of an inactive level may be applied to a reset transistor of a pixel, provided in the sub-pixel, to turn off the reset transistor. Charges generated in a photoelectric conversion element of the sub-pixel may be transferred to the floating diffusion node, and the photoelectric conversion element may be reset. Thereafter, after the transfer control signal is transitioned to the inactive level to turn off the transfer transistor, the reset signal may be transitioned to the active level to turn on the reset transistor. Accordingly, a reset voltage may be applied to the floating diffusion node to reset the floating diffuser node.

As described above, the first pixel PX1 and the second pixel PX2 may alternately reset the sub-pixels and read out the sub-pixels, and in a horizontal period in which the sub-pixel of the first pixel PX1 is read out (for example, the third horizontal period 3H, the fourth horizontal period 4H, the seventh horizontal period 7H, and the eighth horizontal period 8H), the sub-pixel of the second pixel PX2 may be reset, and in a horizontal period in which the sub-pixel of the second pixel PX2 is read out (for example, the fifth horizontal period 5H, the sixth horizontal period 6H, the ninth horizontal period 9H, and the tenth horizontal period 10H), the sub-pixel of the first pixel PX1 may be reset.

Figure 7:
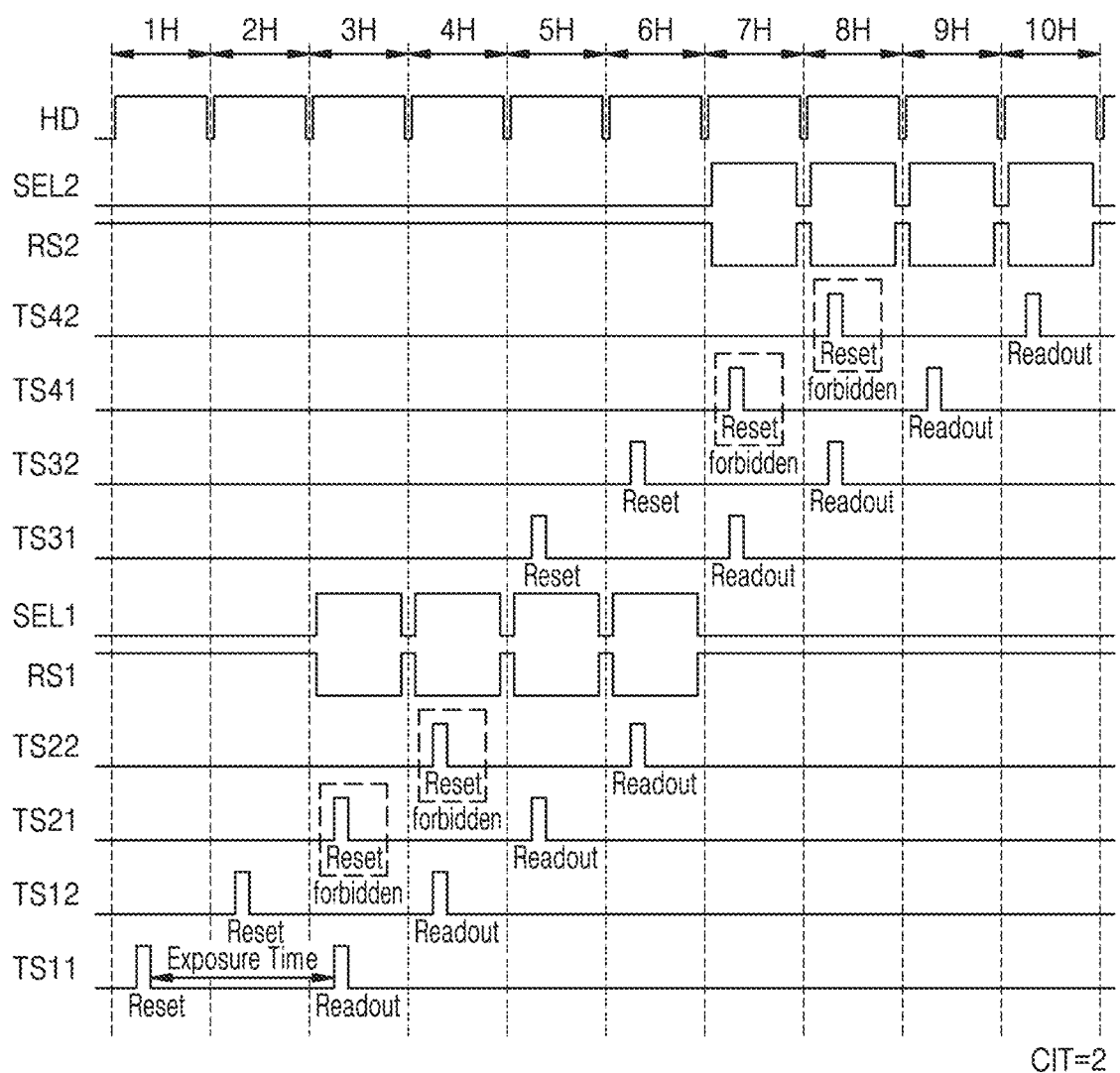
FIG. 7 is a timing diagram of control signals provided to a pixel array, according to a comparative example.

FIG. 7 is a timing diagram of control signals provided to a pixel array according to a comparative example.

An exposure time setting value, for example, CIT, is set to 2, and accordingly, a time corresponding to approximately two horizontal periods may be set as the exposure time.

Referring to FIG. 7, the sub-pixels of the first pixel PX1 and the second pixel PX2 may be sequentially reset and the sub-pixels may be sequentially read out. Here, in the third horizontal period 3H, the first transfer transistor TX11 may be turned on in response to a pulse signal of the first transfer control signal TS11 (e.g., a readout control signal), and the first sub-pixel of the first pixel PX1 may be read out. Also, the third sub-pixel of the first pixel PX1 may be reset in response to a pulse signal of the third transfer control signal TS21 (e.g., a reset control signal). As the first sub-pixel and the second sub-pixel share the floating diffusion node FD1, when the third sub-pixel is reset, the electric potential of the floating diffusion node FD1 is changed, and accordingly, when the first sub-pixel is read out, noise may be added to a pixel signal from the first sub-pixel, output to the column line CL. Thus, reset of other sub-pixels in the same pixel in a horizontal period in which the sub-pixel is read out, that is, in the horizontal period in which a pixel signal from the sub-pixel is output, may be prohibited.

As readout or reset of other sub-pixels is prohibited in the horizontal period in which a sub-pixel is read from the same pixel, as illustrated in FIG. 7, when the sub-pixels of the first pixel PX1 and the second pixel PX2 are sequentially reset and the sub-pixels are sequentially read out, an exposure time setting value, for example, a CIT, cannot be set to 3 or less, causing restrictions on the setting of an exposure time. For example, a time corresponding to approximately three horizontal periods or less cannot be set as an exposure time, thus limiting the setting of a minimum exposure period.

However, as described with reference to FIG. 6, in the image sensor 100 according to some example embodiments, in order that the first pixel PX1 and the second pixel PX2 may alternately perform a reset operation of sub-pixels and a readout operation of sub-pixels, the reset order of the eight sub-pixels included in the first pixel PX1 and the second pixel PX2 and the readout order of the eight sub-pixels may be changed according to an exposure time setting value. Therefore, the restrictions on the setting an exposure time may be overcome, and by setting one horizontal period as an exposure time, a minimum exposure time may be set. Accordingly, a minimum exposure time may be set in a super high light environment, and thus, the dynamic range of an image generated by the image sensor 100 may be extended.

FIGS. 8A to 8D illustrate a reset order and a readout order according to exposure time setting of a pixel array according to some example embodiments.

As described with reference to FIG. 3A, it is assumed that a first pixel and a second pixel each including sub-pixels of a 2×2 matrix having a Bayer pattern are arranged in first to fourth rows. The sub-pixels of the first pixel may be arranged in the first row and the second row, first green sub-pixels Gr1 may be arranged in even-numbered columns of the first row, red sub-pixels R1 may be arranged in odd-numbered columns of the first row, blue sub-pixels B1 may be arranged in even-numbered columns of the second row, and second green sub-pixels Gb1 may be arranged in odd-numbered columns of the second row. The sub-pixels of the second pixel may be arranged in the third row and the fourth row, first green sub-pixels Gr2 may be arranged in even-numbered columns of the third row, red sub-pixels R2 may be arranged in odd-numbered columns of the third row, blue sub-pixels B2 may be arranged in even-numbered columns of the fourth row, and second green sub-pixels Gb2 may be arranged in odd-numbered columns of the fourth row.

Referring to FIG. 8A, when a CIT for setting an exposure time is set to 1, after the sub-pixels are reset, the sub-pixels may be read out in a next horizontal period. Here, readout of a sub-pixel means that a pixel signal from the sub-pixel is output to a column line. As described with reference to FIG. 6, an exposure time of a sub-pixel may be from a time point when a transfer transistor of the sub-pixel is turned off after the transfer transistor is turned on to reset a photoelectric conversion element, to a time point when the transfer transistor is turned on again to read out the sub-pixel, and the exposure times of the plurality of sub-pixels may be the same.

In the fourth horizontal period 4H, the first green sub-pixel Gr1 of the first pixel may be reset. In the fifth horizontal period 5H, the first green sub-pixel Gr1 of the first pixel may be read out, and the first green sub-pixel Gr2 of the second pixel may be reset. In the sixth horizontal period 6H, the first green sub-pixel Gr2 of the second pixel may be read out, and the red sub-pixel R1 of the first pixel may be reset.

As described above, after being reset, the sub-pixels may be read out in a next horizontal period, and the sub-pixel of the second pixel may be reset in a horizontal period in which the sub-pixel of the first pixel is read, and the sub-pixel of the second pixel may be read out in a horizontal period in which the sub-pixel of the first pixel is reset.

Referring to FIG. 8B, when a CIT is set to 2, the sub-pixel may be reset, and the sub-pixel may be read out in a horizontal period after one horizontal period.

The first green sub-pixel Gr1 of the first pixel may be reset in the third horizontal period 3H, and the red sub-pixel R1 of the first pixel may be reset in the fourth horizontal period 4H. In the fifth horizontal period 5H, the first green sub-pixel Gr1 of the first pixel may be read and the first green sub-pixel Gr2 of the second pixel may be reset. In the sixth horizontal period 6H, the red sub-pixel R1 of the first pixel may be read, and the red sub-pixel R2 of the second pixel may be reset. In the seventh horizontal period 7H, the first green sub-pixel Gr2 of the second pixel may be read, and the blue sub-pixel B1 of the first pixel may be reset. In the eighth horizontal period 8H, the red sub-pixel R2 of the second pixel may be read, and the second green sub-pixel Gb2 of the first pixel may be reset.

As described above, after two sub-pixels included in one pixel are sequentially reset, they may be sequentially read out. The sub-pixel of the second pixel may be reset in the horizontal period in which the sub-pixel of the first pixel is read out, and the sub-pixel of the second pixel may be read out in the horizontal period in which the sub-pixel of the first pixel is reset.

Referring to FIG. 8C, when a CIT is set to 3, the sub-pixel may be reset, and the sub-pixel may be read out in a horizontal period after two horizontal periods.

In the second horizontal period 2H, the first green sub-pixel Gr1 of the first pixel may be reset, and in the third horizontal period 3H, the first green sub-pixel Gr2 of the second pixel may be reset, and the red sub-pixel R1 of the first pixel may be reset in the fourth horizontal period 4H. In the fifth horizontal period 5H, the first green sub-pixel Gr1 of the first pixel may be read out and the red sub-pixel R2 of the second pixel may be reset. In the sixth horizontal period 6H, the first green sub-pixel Gr2 of the second pixel may be read out and the blue sub-pixel B1 of the first pixel may be reset. In the seventh horizontal period 7H, the red sub-pixel R1 of the first pixel may be read, and the blue sub-pixel B2 of the second pixel may be reset.

As described above, the sub-pixels may be reset and read in a horizontal period after two horizontal periods. The sub-pixel of the second pixel may be reset in the horizontal period in which the sub-pixel of the first pixel is read out, and the sub-pixel of the second pixel may be read in the horizontal period in which the sub-pixel of the first pixel is reset.

Referring to FIG. 8D, when a CIT is set to 4, the sub-pixel may be reset, and the sub-pixel may be read out in a horizontal period after three horizontal periods.

In the first to fourth horizontal periods 1H, 2H, 3H, and 4H, the first green sub-pixel Gr1, the red sub-pixel R1, the blue sub-pixel B1, and the second green sub-pixel Gb1 of the first pixel may be sequentially reset, and in the fifth to eighth horizontal periods 5H, 6H, 7H, and 8H, the first green sub-pixel Gr1, the red sub-pixel R1, the blue sub-pixel B1, and the second green sub-pixel Gb1 of the first pixel may be sequentially read out. In addition, in the fifth to eighth horizontal periods 5H, 6H, 7H, and 8H, the first green sub-pixel Gr2, the red sub-pixel R2, the blue sub-pixel B2, and the second green sub-pixel Gb2 of the second pixel may be sequentially reset, and in the ninth to twelfth horizontal periods 9H, 10H, 11H, and 12H, the first green sub-pixel Gr2, the red sub-pixel R2, the blue sub-pixel B2, and the second green sub-pixel Gb2 of the second pixel may be sequentially read out.

When the CIT is set to 4 or more, the sub-pixels of the first pixel and the second pixel may be sequentially reset and read as described above.

As described with reference to FIGS. 8A to 8D, the exposure time may be changed according to the CIT, and when the CIT is 1, a shortest exposure time may be set, and the exposure time may increase as the CIT increases.

FIGS. 9A to 9H illustrate a readout order of sub-pixels provided in a pixel array according to some example embodiments.

Referring to FIGS. 9A to 9H, sub-pixels of the first pixel PX1 and a fifth pixel PX5 may be arranged in the first row Row1 and the second row Row2, and sub-pixels of the second pixel PX2 and a sixth pixel PX6 may be arranged in the third row Row3 and the fourth row Row4, and sub-pixels of the third pixel PX3 and a seventh pixel PX7 may be arranged in the fifth row and the sixth row Row6, and sub-pixels of the fourth pixel PX4 and an eighth pixel PX8 may be arranged in the seventh row Row7 and the eighth Row8.

In some example embodiments, for fast readout, sub-pixels arranged in two rows may be read simultaneously in one horizontal period, and to this end, some of pixels arranged in the same column, for example, the first pixel PX1 and the second pixel PX2, may be connected to a first column line CL1, and other pixels, for example, the third pixel PX3 and the fourth pixel PX4, may be connected to a second column line CL2. A pixel signal output from the first pixel PX1 and the second pixel PX2 may be provided to a first ADC ADC1, and a pixel signal output from the third pixel PX3 and the fourth pixel PX4 may be provided to a second ADC ADC2. The fifth pixel PX5 and the sixth pixel PX6 may be connected to a third column line CL3, and a pixel signal output from the fifth pixel PX5 and the sixth pixel PX6 may be provided to a third ADC ADC3. The seventh pixel PX7 and the eighth pixel PX8 may be connected to a fourth column line CL4, and a pixel signal output from the seventh pixel PX7 and the eighth pixel PX8 may be provided to a fourth ADC ADC4. However, the inventive concepts are not limited thereto, and sub-pixels arranged in one row may be read in one horizontal period, and to this end, pixels arranged in the same column may be connected to the same column line.

Figure 9A:
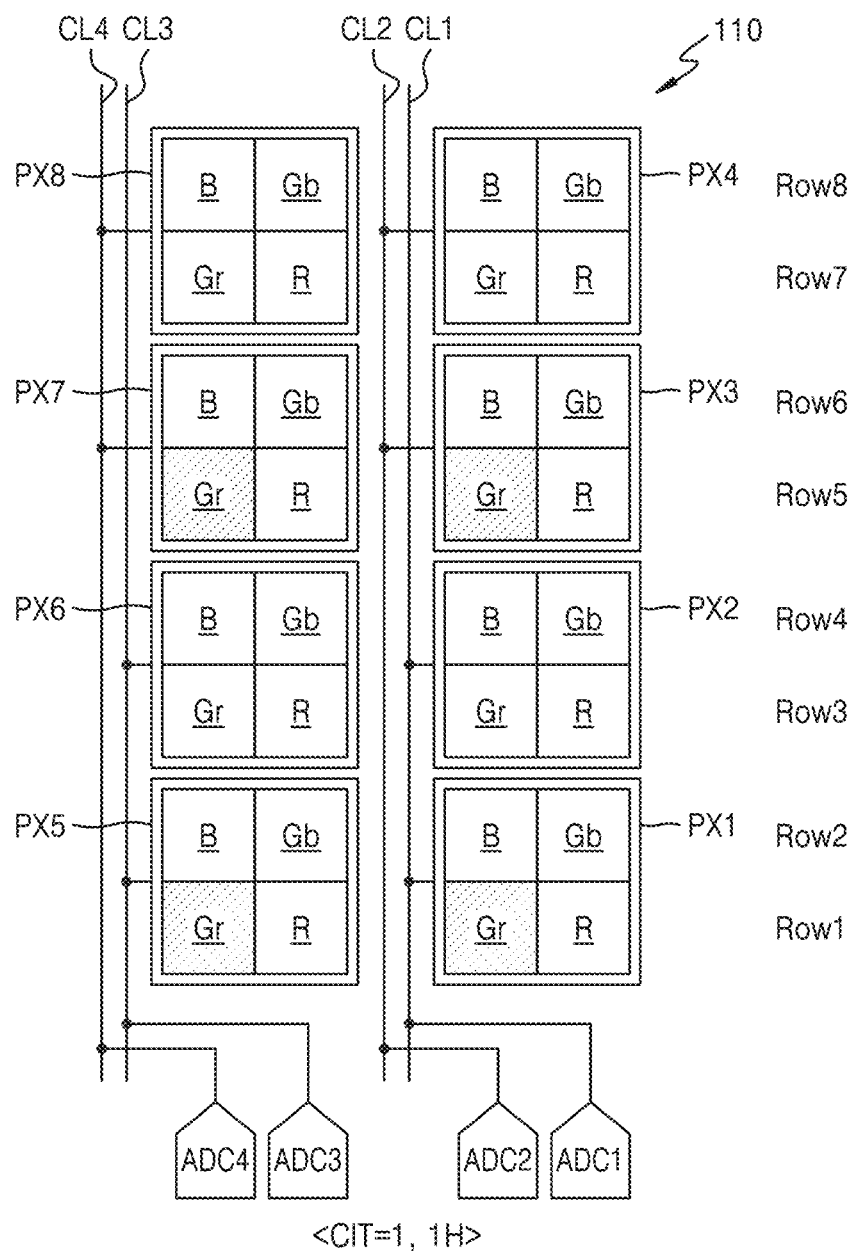
FIGS. 9A to 9H illustrate a readout order of sub-pixels provided in a pixel array according to some example embodiments.
Figure 9B:
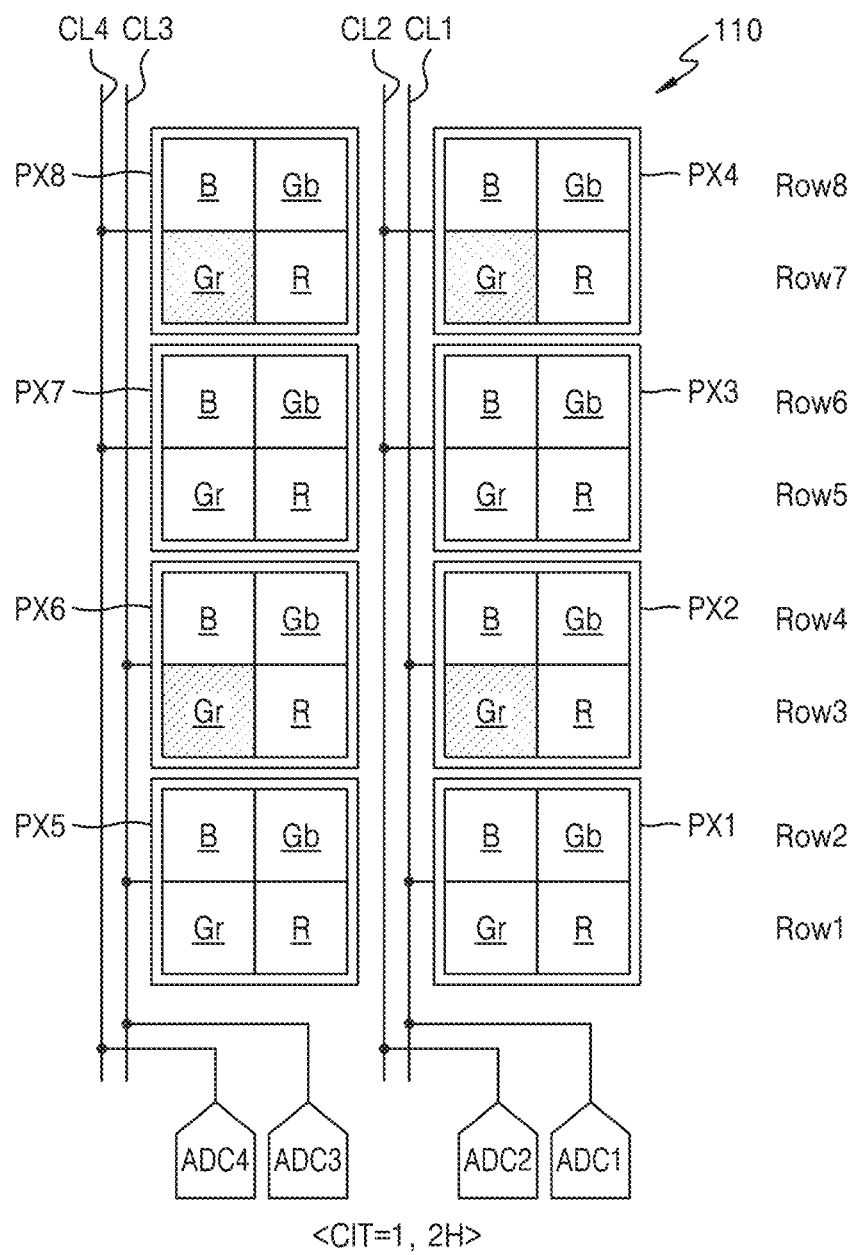

FIGS. 9A to 9B show a readout order of sub-pixels when a CIT is set to 1. Since the CIT is set to 1, the sub-pixels read out in each horizontal period may be reset in a previous horizontal period.

Referring to FIG. 9A, in the first horizontal period 1H, the first green sub-pixels Gr of the first pixel PX1, the third pixel PX3, the fifth pixel PX5, and the seventh pixel PX7 is read out. Pixel signals output to the first to fourth column lines CL1, CL2, CL3, and CL4 may be converted to pixel value by the first to fourth ADCs ADC1, ADC2, ADC3, and ADC4, respectively, and stored in a line buffer of a memory (160 of FIG. 1).

Subsequently, as illustrated in FIG. 9B, in the second horizontal period 2H, the first green sub-pixels Gr of the second pixel PX2, the fourth pixel PX4, the sixth pixel PX6, and the eighth pixel PX8 may be read out.

Figure 9C:
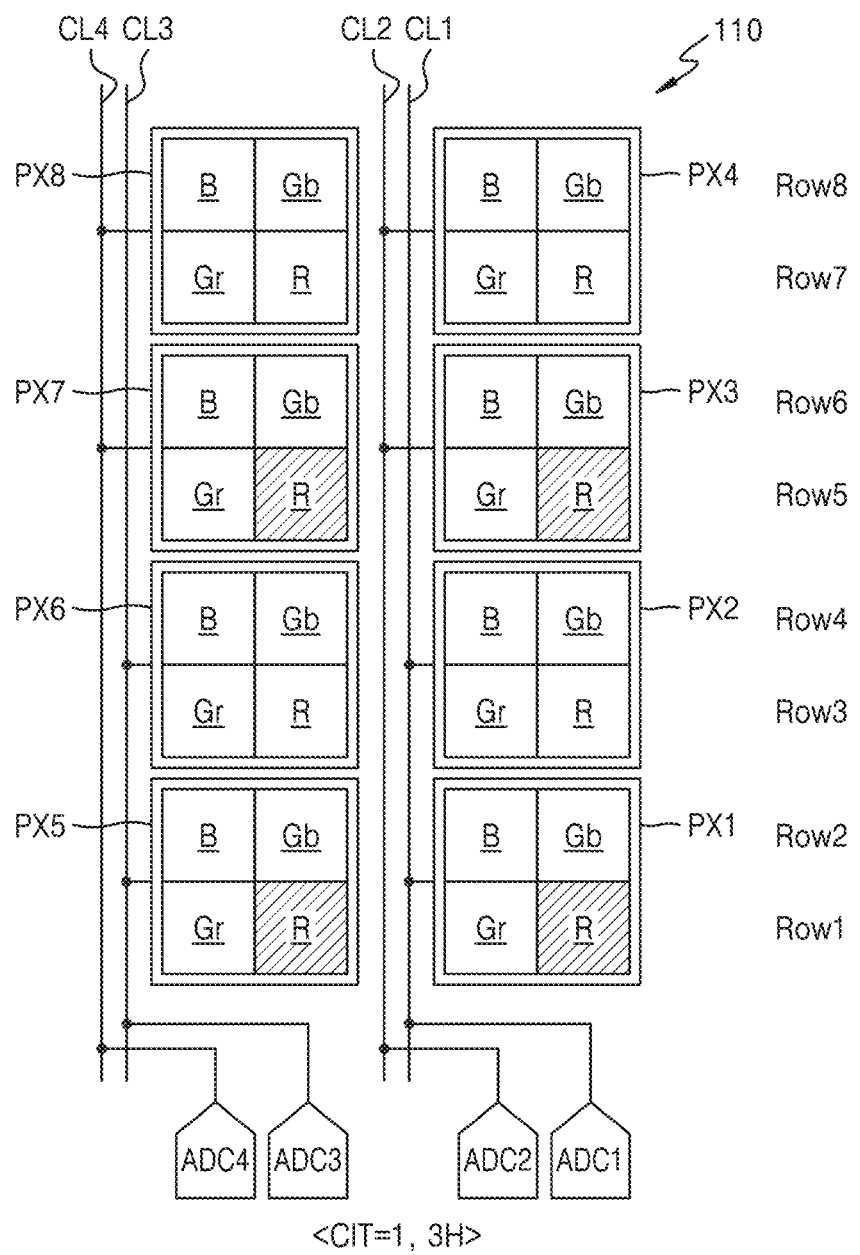

Referring to FIG. 9C, in the third horizontal period 3H, the red sub-pixels R of the first pixel PX1, the third pixel PX3, the fifth pixel PX5, and the seventh pixel PX7 may be read out.

Figure 9D:
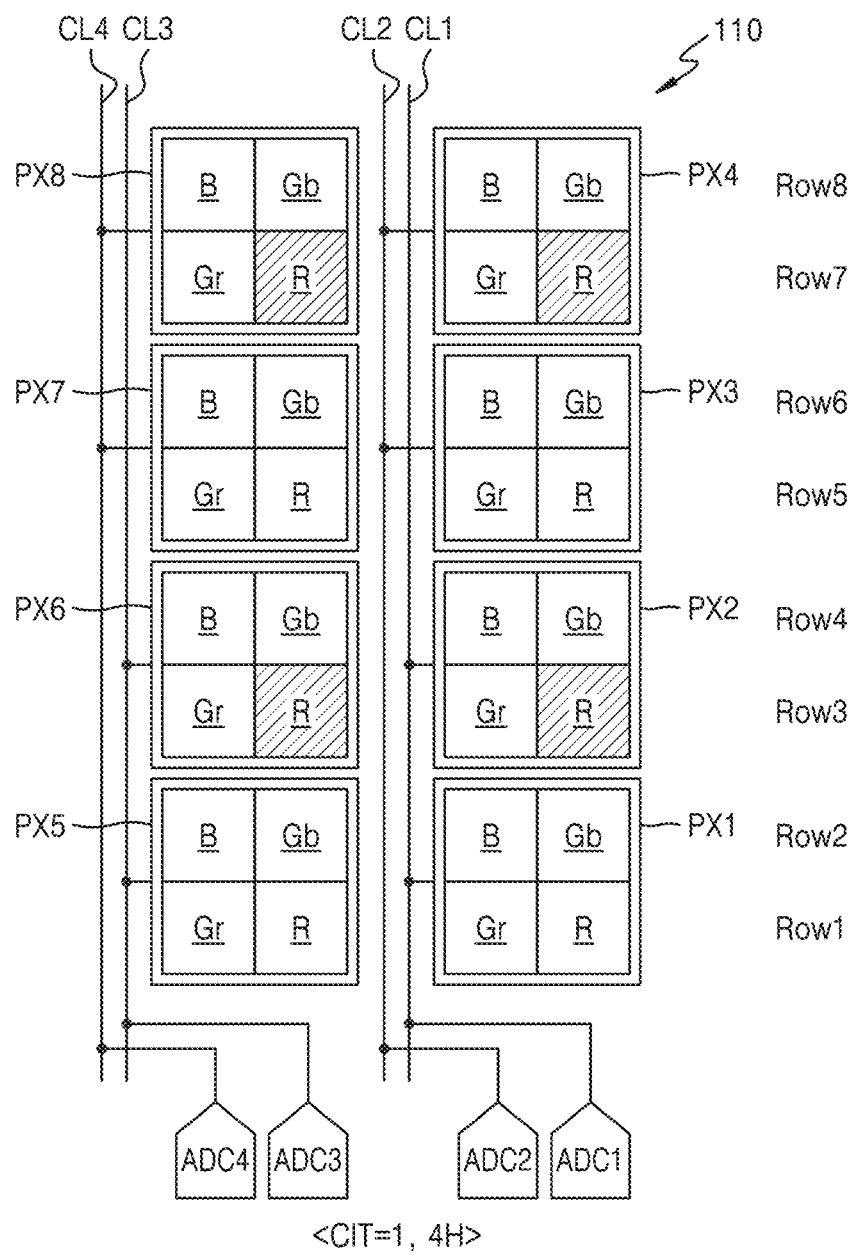

Referring to FIG. 9D, in the fourth horizontal period 4H, the red sub-pixels R of the second pixel PX2, the fourth pixel PX4, the sixth pixel PX6, and the eighth pixel PX8 may be read out.

Figure 9E:
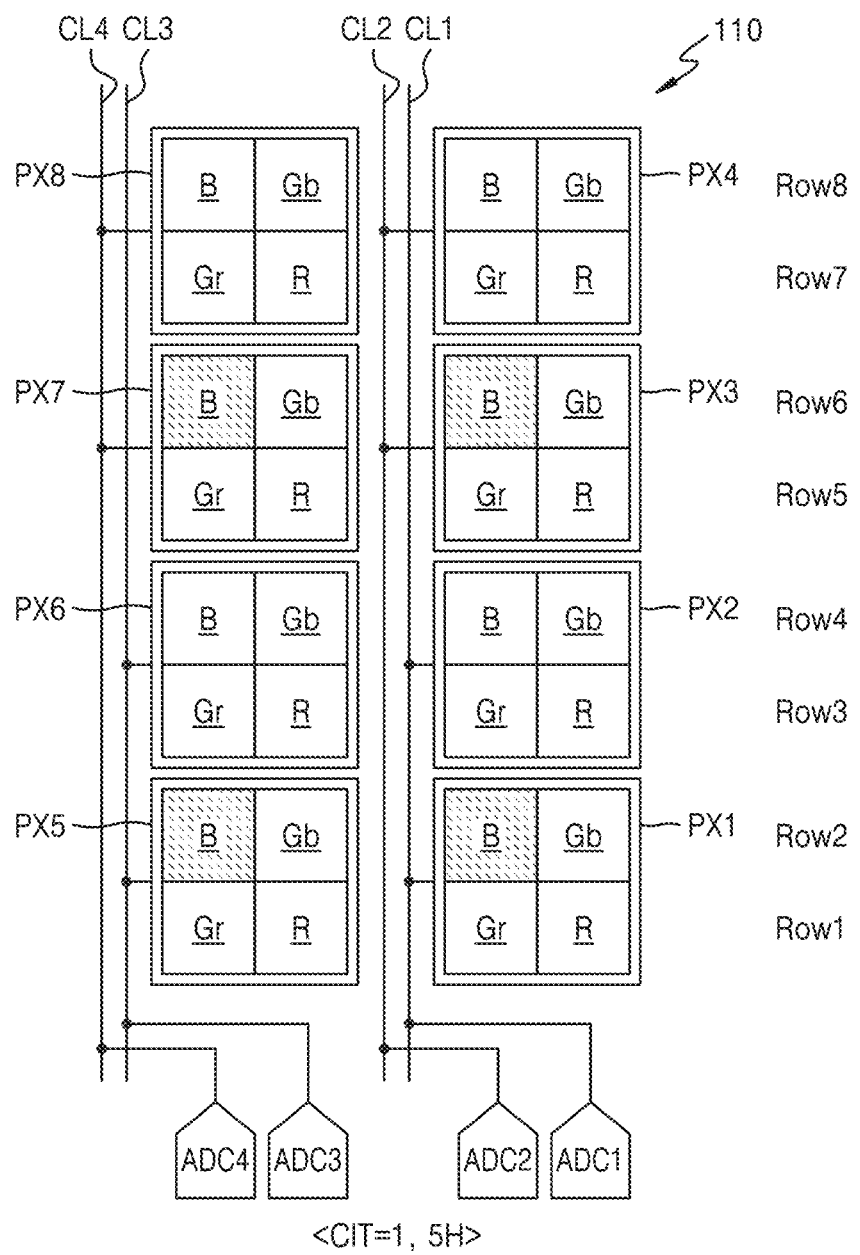

Referring to FIG. 9E the blue sub-pixels B of the first pixel PX1, the third pixel PX3, the fifth pixel PX5, and the seventh pixel PX7 may be read out in the fifth horizontal period 5H.

Figure 9F:
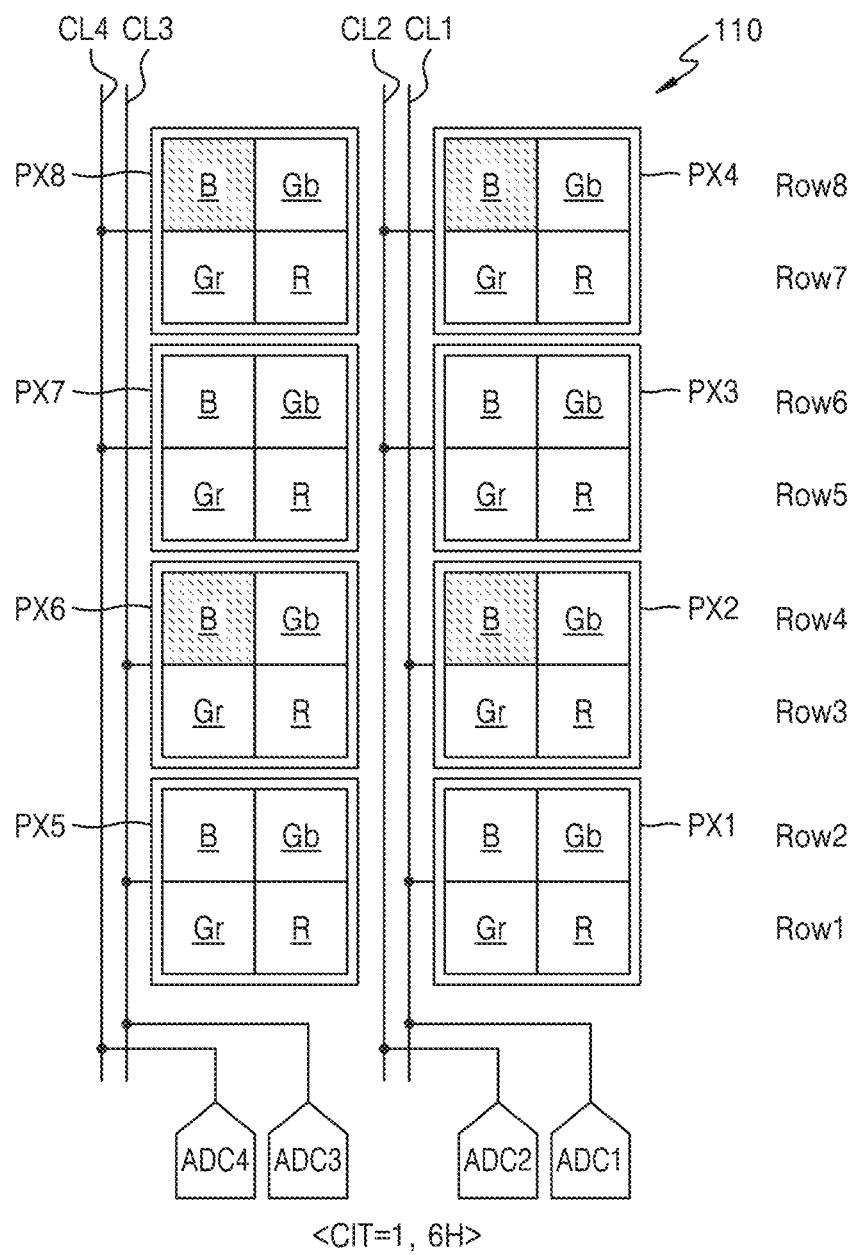

Referring to FIG. 9F, in the sixth horizontal period 6H, the blue sub-pixels B of the second pixel PX2, the fourth pixel PX4, the sixth pixel PX6, and the eighth pixel PX8 may be read out.

Figure 9G:
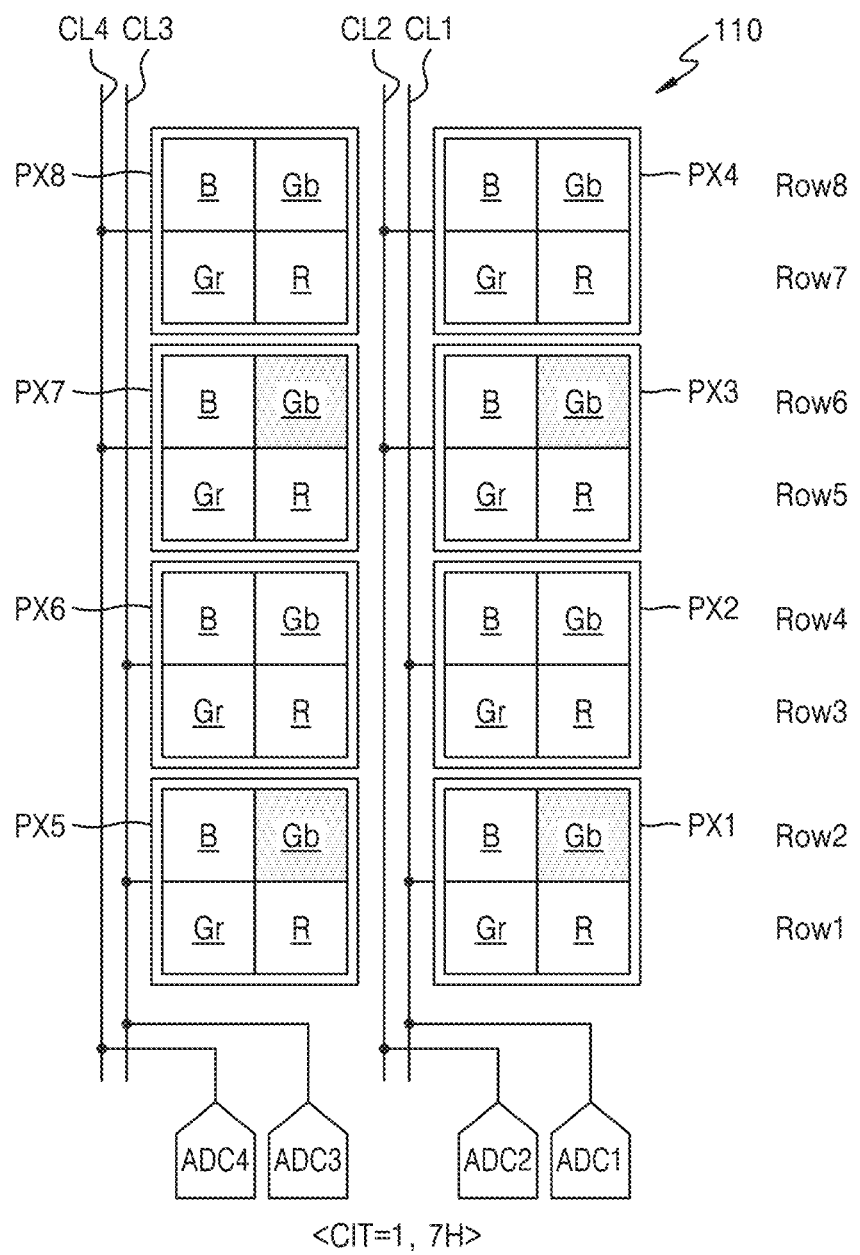
Figure 9H:
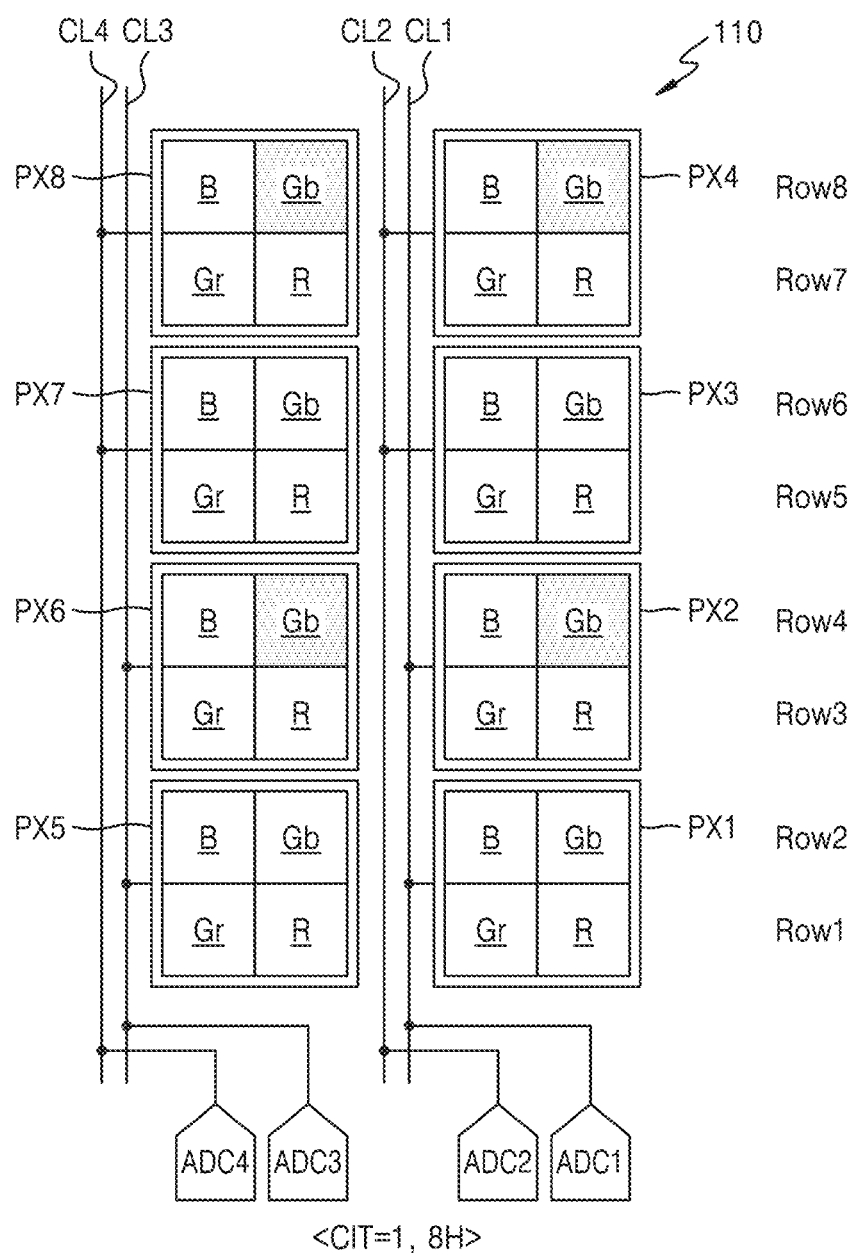

Referring to FIG. 9G, in the seventh horizontal period 7H, the second green sub-pixels Gb of the first pixel PX1, the third pixel PX3, the fifth pixel PX5, and the seventh pixel PX7 may be read out.

Referring to FIG. 9F, in the eighth horizontal period 8H, the second green sub-pixels Gb of the second pixel PX2, the fourth pixel PX4, the sixth pixel PX6, and the eighth pixel PX8 may be read out.

Pixel values generated from pixel signals output during the same horizontal period and converted to digital signals may be stored in the same line buffer of the memory 160.

Figure 10:
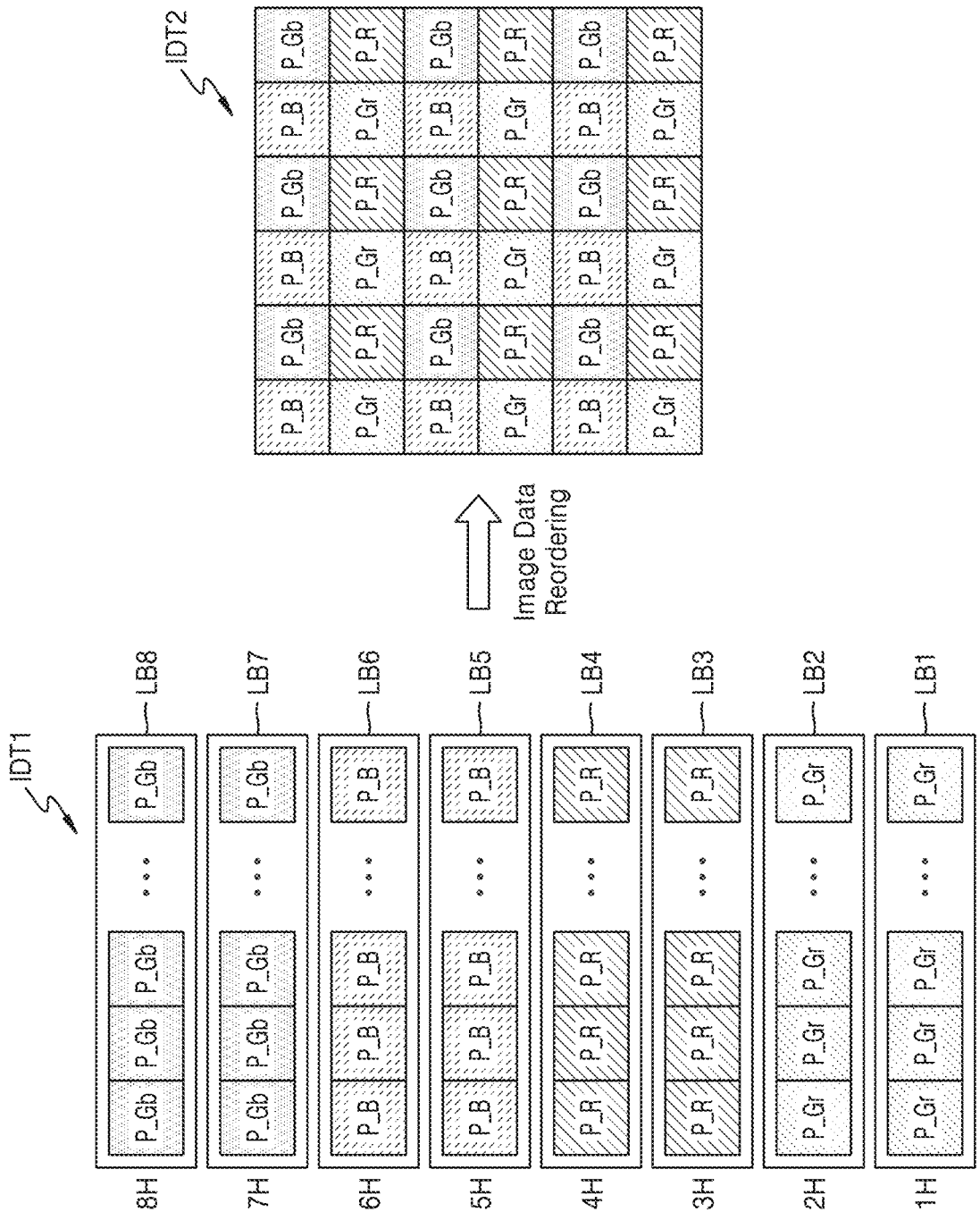
FIG. 10 illustrates conversion of image data stored in line buffers to image data according to a color pattern in an image sensor according to some example embodiments.

FIG. 10 illustrates conversion of image data stored in line buffers, to image data according to a color pattern in an image sensor according to some example embodiments. Conversion of image data of FIG. 10 may be performed, for example, by the image converting circuit 150 of FIG. 1.

As described with reference to FIGS. 9A to 9H, pixel values corresponding to pixel signals output from a plurality of sub-pixels provided in pixels in a plurality of horizontal periods 1H to 8H are stored in the memory (FIG. 1 of 160 may be stored as first image data IDT1 in line buffers LB1 to LB7. For example, first pixel values P_Gr generated in the first horizontal period 1H and the second horizontal period 2H may be stored in first line buffer LB1 and the second line buffer LB2, second pixel values P_R generated in the third and fourth horizontal periods 3H and 4H may be stored in third and fourth line buffers LB3 and LB4, third pixel values P_B generated in the fifth horizontal period 5H and the sixth horizontal period 6H may be stored in fifth line buffer LB5 and the sixth line buffer LB6, and fourth pixel values P_Gb generated in the seventh horizontal period 7H and the eighth horizontal period 8H may be stored in seventh line buffer LB7 and the eighth line buffer LB8. Here, the first pixel value P_Gr may be a pixel value corresponding to the first green sub-pixel (Gr in FIG. 9A), the second pixel value P_R may be a pixel value corresponding to the red sub-pixel (R in FIG. 9A), and the third pixel value (P_B) may be a pixel value corresponding to the blue sub-pixel (B in FIG. 9A), and the fourth pixel value P_Gb may be a pixel value corresponding to the second green sub-pixel (Gb in FIG. 9A).

The image signal processor (170 of FIG. 1) may perform signal processing on image data of a specific color pattern, for example, a Bayer pattern. Accordingly, the image converting circuit 150 may access the memory 160 to convert the first image data IDT1 to the second image data IDT2 having a Bayer pattern.

Figure 11:
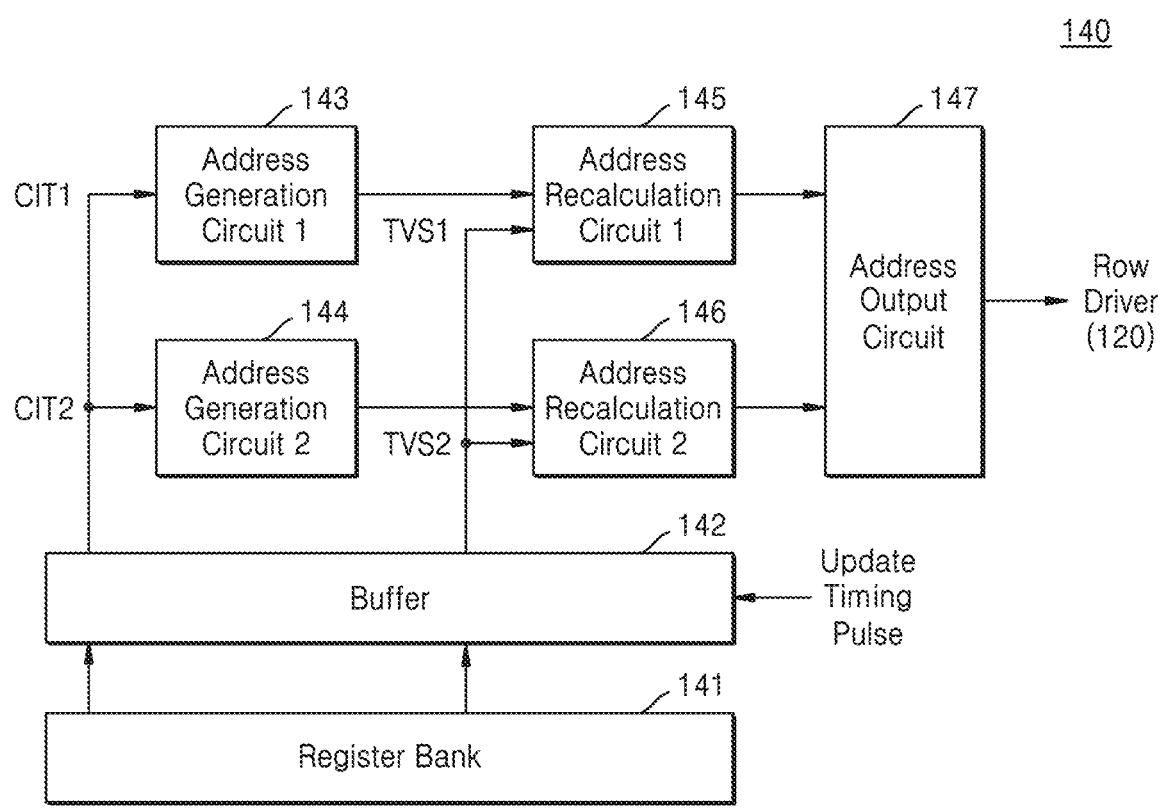
FIG. 11 is a block diagram illustrating a timing generator according to some example embodiments.

FIG. 11 is a block diagram illustrating a timing generator according to some example embodiments.

Referring to FIG. 11, the timing controller 140 may include a register bank 141, a buffer 142, a first address generation circuit 143, a second address generation circuit 144, and a first address recalculation circuit 145, a second address recalculation circuit 146, and an address output circuit 147. The first address generation circuit 143, the second address generation circuit 144, the first address recalculation circuit 145, the second address recalculation circuit 146, and the address output circuit 147 may be implemented in hardware or a combination of hardware and software.

The register bank 141 may store an exposure time setting value (e.g., CIT) and sets of a plurality of tuning values corresponding to a plurality of exposure time setting values. The exposure time setting values may be stored in the register bank 141. A set of a plurality of tuning values may be preset to correspond to respective exposure time setting values and stored in the register bank 141.

The exposure time setting values may be provided from an external processor that communicates with the image sensor (100 in FIG. 1), for example, an application processor, and may be changed in every frame according to the ambient illuminance of the image sensor 100 or each time when a change in the ambient illuminance exceeds a certain range. The application processor may receive illuminance information (e.g., illuminance value) from an illuminance sensor and determine a change in the exposure time setting value, e.g., CIT. For example, the application processor can change the CIT whenever an illuminance value exceeds a certain range. When the illuminance becomes low, an exposure time may be increased by setting a relatively large CIT, and when the illuminance increases, the exposure time may be reduced by setting a relatively small CIT.

An exposure time setting value and a set of tuning values corresponding to the exposure time setting value may be provided to the buffer 142. Here, the exposure time setting value may be changed according to the ambient illuminance, and in order that the changed exposure time setting value and a set of tuning values corresponding to the changed exposure time setting value may be applied to a frame starting after the change, the buffer 142 may be implemented as a double buffer.

The buffer 142 may provide an exposure time setting value, e.g., CIT, to the first address generation circuit 143 and the second address generation circuit 144 in synchronization with an update timing pulse indicating an update timing of a frame. Here, CITs provided to the first address generation circuit 143 and the second address generation circuit 144 may be different from each other. The buffer 142 may provide a set of tuning values corresponding to the CIT to the first address recalculation circuit 145 and the second address recalculation circuit 146 in synchronization with the update timing pulse.

For example, a first CIT CIT1 may be set for a Kth frame (K is a positive integer), and a second CIT CIT2 may be set for a K+1th frame. The first CIT CIT1 may be provided to the first address generation circuit 143 before the Kth frame (e.g., a K−1th frame), and a set TVS1 of first tuning values corresponding to the first CIT CIT1 may be provided to the first address recalculation circuit 145.

The first address generation circuit 143 may generate an input row address IR_ADD (or referred to as a reference address). As illustrated in FIGS. 12A to 12C, a value of the input row address IR_ADD may increase sequentially, and may sequentially indicate a plurality of rows of the pixel array (110 of FIG. 1).

The first address generation circuit 143 may generate a readout timing signal, and generate a reset timing signal based on the readout timing signal and the first CIT CIT1. The readout timing signal may indicate a time point at which readout of a sub-pixel starts (e.g., a horizontal period), and the reset timing signal may indicate a time point at which reset of the sub-pixel starts (e.g., a horizontal period). In some example embodiments, the readout timing signal may be fixed to a certain horizontal period (e.g., the fifth horizontal period 5H of FIGS. 8A to 8C), and a reset timing point may be adjusted in units of one horizontal period based on the first CIT CIT1.

For example, when the first CIT CIT1 is 2, as described with reference to FIG. 8B, the first address generation circuit 143 may generate a reset timing signal indicating that a sub-pixel is to be reset in a horizontal period prior two horizontal periods (e.g., the third horizontal period 3H) from a horizontal period in which the sub-pixel is read out (e.g., the fifth horizontal period 5H). For example, when the first CIT CIT1 is 3, as described with reference to FIG. 8C, the first address generation circuit 143 may generate a reset timing signal indicating that a sub-pixel is to be reset in a horizontal period prior three horizontal periods (e.g., the second horizontal period 2H) from a horizontal period in which the sub-pixel is read out (e.g., the fifth horizontal period 5H).

The first address recalculation circuit 145 may generate a recalculated row address based on the input row address IR_ADD provided from the first address generation circuit 143 and the set TVS1 of the first tuning values provided from the buffer 142. In some example embodiments, when the image sensor (100 of FIG. 1) supports fast readout, as described with reference to FIGS. 9A to 9H, sub-pixels arranged in at least two rows may be read out simultaneously. Accordingly, the first address recalculation circuit 145 may generate at least two recalculated row addresses.

The second CIT CIT2 may be provided to the second address generation circuit 144 before the K+1th frame (e.g., the Kth frame), and a set TVS2 of second tuning values corresponding to the second CIT CIT2 may be provided to the second address recalculation circuit 146. The operations of the second address generation circuit 144 and the second address recalculation circuit 146 are similar to the operations of the first address generation circuit 143 and the first address recalculation circuit 145, respectively.

The address output circuit 147 may alternately provide, in each frame, to the row driver 120, a reset timing signal, a readout timing signal, and a recalculated row address generated by the first address generation circuit 143 and the first address recalculation circuit 145 and a reset timing signal, a readout timing signal, and a recalculated row address generated by the second address generation circuit 144 and the second address recalculation circuit 146.

Figure 13:
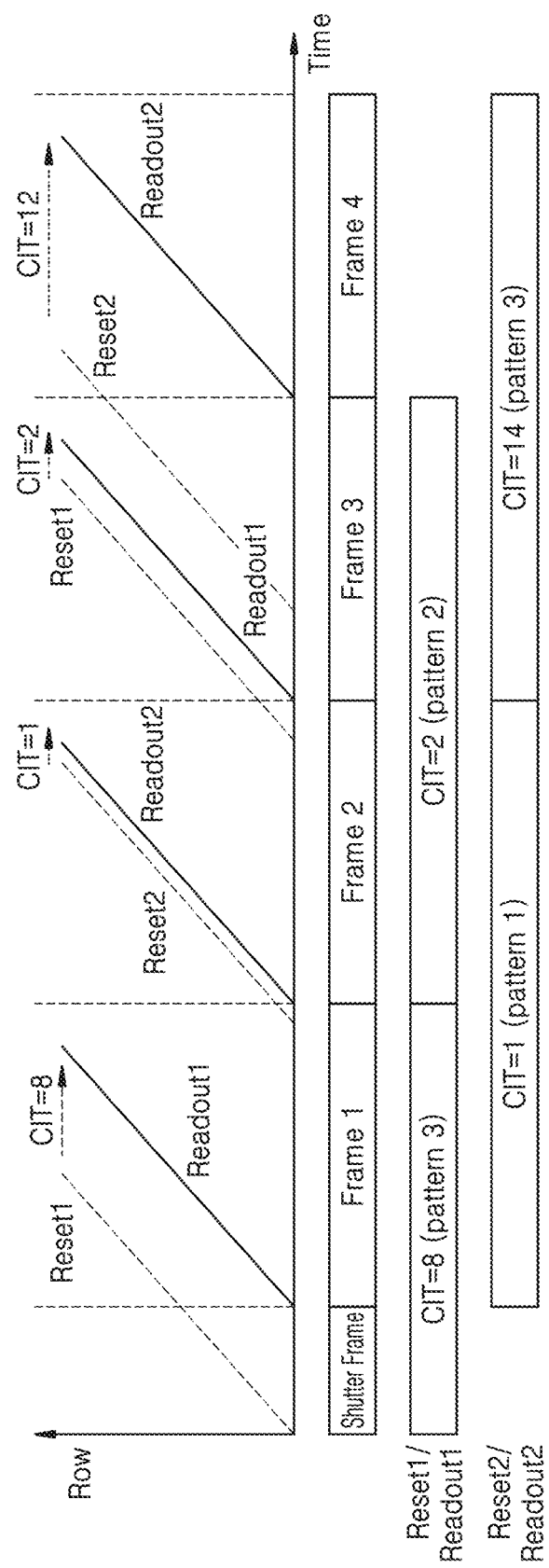
FIG. 13 is a timing diagram for describing reset and readout according to a change in an exposure time setting value in an image sensor according to some example embodiments.

For example, the address output circuit 147 may provide a reset timing signal generated by the first address generation circuit 143 to the row driver 120 in the K−1th frame, and provide a readout timing signal and a recalculated row address generated by the first address generation circuit 143 and the first address recalculation circuit 145, to the row driver 120 in the Kth frame. In addition, the address output circuit 147 may provide a reset timing signal generated by the second address generation circuit 144 to the row driver 120 in the Kth frame, and a readout timing signal and a recalculated row address generated by the second address generation circuit 144 and the second address recalculation circuit 146, to the row driver 120 in the K+1th frame. Accordingly, as illustrated in FIG. 13, when the CIT is changed, the changed CIT may be immediately applied to a next frame, thereby preventing or reducing the occurrence of a dead frame.

FIGS. 12A to 12C illustrate an address calculation method of a timing generator, according to some example embodiments.

FIG. 12A shows a case when a CIT is 1 or 3, FIG. 12B shows a case when a CIT is 2, and FIG. 12C shows a case when a CIT is 4 or more. It is assumed that a pixel includes four sub-pixels arranged in a 2×2 matrix. FIGS. 12A to 12C illustrate an address calculation method performed when sub-pixels arranged in two non-adjacent rows are read out simultaneously for fast readout, as described with reference to FIGS. 9A to 9H. The address calculation method will be described with reference to FIGS. 9A to 9H together.

Referring to FIG. 12A, the input row address IR_ADD generated by an address generation circuit (e.g., the first address generation circuit 143 or the second address generation circuit 144 of FIG. 11) may have a value increasing from 0 one by one. The input row address IR_ADD may indicate a value for sequentially selecting a plurality of rows (e.g., the first row Row1 to the eighth row Row8) provided in the pixel array (110 in FIGS. 9A to 9H) in every horizontal period.

When the CIT is 1 or 3, a set TVS of tuning values may be 0, −1, 2, 1, 3, 2, 5, 4, as shown. The address recalculation circuit (e.g., the first address recalculation circuit 145 or the second address recalculation circuit 146 of FIG. 11) may generate, as a first recalculated row address RR_ADD_0, a value obtained by subtracting a corresponding tuning value from the input row address IR_ADD, and generate, as a second recalculated row address RR_ADD_1, a value calculated by adding 4 to the first recalculated row address RR_ADD_0. The first recalculated row address RR_ADD_0 may be 0, 2, 0, 2, 1, 3, 1, 3, and the second recalculated row address RR_ADD_1 may be 4, 6, 4, 6, 5, 7, 5, 7. When the first recalculated row address RR_ADD_0 is '0', the first row Row1 in the pixel array 110 is indicated, and when the second recalculated row address RR_ADD_1 is '4', the fifth row Row5 in the pixel array 110 is indicated.

An E_O phase indicates sub-pixels arranged in odd-numbered columns or sub-pixels in even-numbered columns among sub-pixels provided in rows indicated by the first recalculated row address RR_ADD_0 and the second recalculated row address RR_ADD_1. When the E_O phase is an even number (E), a sub-pixel arranged in an even-numbered column may be read, and when the E_O phase is an odd number (O), a sub-pixel arranged in an odd-numbered column may be read out.

For example, when the input address IR_ADD is '0', the first recalculated row address RR_ADD_0 is '0', and the second recalculated row address RR_ADD_1 is '4', and the E_O phase is an even number (E). Accordingly, in the first horizontal period, first green sub-pixels Gr1 and Gr3 of the first pixel PX1 and the third pixel PX3 arranged in even-numbered columns of the first row and the fifth row may be read simultaneously.

When the input address IR_ADD is '1', the first recalculated row address RR_ADD_0 is '2', and the second recalculated row address RR_ADD_1 is '6', and the E_O phase is an even number (E). Accordingly, in the second horizontal period, first green sub-pixels Gr2 and Gr4 of the second pixel PX2 and the fourth pixel PX4 arranged in even-numbered columns of the third row and the seventh row may be read simultaneously.

When the input address IR_ADD is '2', the first recalculated row address RR_ADD_0 is '0', and the second recalculated row address RR_ADD_1 is '4', and the E_O phase is an odd number (O). Accordingly, in the third horizontal period, red sub-pixels R1 and R3 of the first pixel PX1 and the third pixel PX3 arranged in odd-numbered columns of the first row and the fifth row may be read simultaneously.

When the input address IR_ADD is '3', the first recalculated row address RR_ADD_0 is '2', and the second recalculated row address RR_ADD_1 is '6', and the E_O phase is an odd number (O). Accordingly, in the fourth horizontal period, red sub-pixels R2 and R4 of the second pixel PX2 and the fourth pixel PX4 arranged in odd-numbered columns of the third row and the seventh row may be read simultaneously.

In the fifth horizontal period, blue sub-pixels B1 and B3 of the first pixel PX1 and the third pixel PX3 arranged in even-numbered columns of the second row and the sixth row may be read simultaneously; in the sixth horizontal period, blue sub-pixels B2 and B4 of the second pixel PX2 and the fourth pixel PX4 arranged in even-numbered columns of the fourth row and the eighth row may be read simultaneously; in the seventh horizontal period, second green sub-pixels Gb1 and Gb3 of the first pixel PX1 and the third pixel PX3 arranged in odd-numbered columns of the second row and the sixth row may be read simultaneously; and in the eighth horizontal period, second green sub-pixels Gb2 and Gb4 of the second pixel PX2 and the fourth pixel PX4 arranged in odd-numbered columns of the fourth row and the eighth row may be read simultaneously.

As described above, when the CIT is set to 1 or 3, sub-pixels may be alternately read from two adjacent pixels connected to the same column line (e.g., the first pixel PX1 and the second pixel PX2, or the third pixel PX3 and the fourth pixel PX4) in each horizontal period.

Referring to FIG. 12B, the input row address IR_ADD may have a value increasing one by one. When the CIT is 2, a set of tuning values may be 0, 1, 0, 1, 3, 4, 3, 4, as shown. A value obtained by subtracting a tuning value from the input row address IR_ADD may be generated as the first recalculated row address RR_ADD_0, and a value obtained by adding 4 to the first recalculated row address RR_ADD_0 may be generated as the second recalculated row address RR_ADD_1.

As illustrated, the first recalculated row address RR_ADD_0 is 0, 2, 2, 1, 1, 3, 3, and the second recalculated row address RR_ADD_1 is 4, 4, 6, 6, 5, 5, 7, 7, and the E_O phase may be changed in every horizontal period. Accordingly, in the first horizontal period, the first green sub-pixels Gr1 and Gr3 of the first pixel and the third pixel arranged in the even-numbered columns of the first row and the fifth row may be read out; in the second horizontal period, the red sub-pixels R1 and R3 arranged in the odd-numbered columns of the first row and the fifth row may be read; in the third horizontal period, the first green sub-pixels Gr2 and Gr4 of the second pixel and the fourth pixel arranged in the even-numbered columns of the third row and the seventh row may be read out; and in the fourth horizontal period, the red sub-pixels R2 and R4 of the second pixel and fourth pixel arranged in the odd-numbered columns of the third row and the seventh row may be read out. In addition, in the fifth horizontal period, the blue sub-pixels B1 and B3 of the first pixel and the third pixel arranged in the even-numbered columns of the second row and the sixth row may be read out; in the sixth horizontal period, the second green sub-pixels Gb1 and Gb3 of the first pixel and the third pixel arranged in the odd-numbered columns of the second row and the sixth row may be read out; in the seventh horizontal period, the blue sub-pixels B2 and B4 of the second pixel and the fourth pixel arranged in the even-numbered columns of the fourth row and the eighth row may be read out; and in the eighth horizontal period, the second green sub-pixels Gb2 and Gb4 of the second pixel and the fourth pixel arranged in the odd-numbered columns of the fourth row and the eighth row may be read out.

When the CIT is set to 2, sub-pixels may be alternately read out from two adjacent pixels connected to the same column line (e.g., the first pixel PX1 and the second pixel PX2, or the third pixel PX3 and the fourth pixel PX4) every two horizontal periods. Referring to FIG. 12C, the input row address IR_ADD may have a value increasing one by one. When the CIT is greater than or equal to 4, a set of tuning values may be 0, 1, 1, 2, 2, 3, 3, 4, as shown. A value obtained by subtracting a tuning value from the input row address IR_ADD may be generated as the first recalculated row address RR_ADD_0, and a value obtained by adding 4 to the first recalculated row address RR_ADD_0 may be generated as the second recalculated row address RR_ADD_1.

As illustrated, the first recalculated row address RR_ADD_0 is 0, 0, 1, 1, 2, 2, 3, 3, and the second recalculated row address RR_ADD_1 is 4, 4, 5, 5, 6, 6, 7, 7, and the E_O phase may be changed in every horizontal period. Accordingly, in the first horizontal period, the first green sub-pixels Gr1 and Gr3 of the first pixel and the third pixel arranged in the even-numbered columns of the first row and the fifth row may be read out; in the second horizontal period, the red sub-pixels R1 and R3 of the first pixel and the third pixel arranged in the odd-numbered columns of the first row and the fifth row may be read out; in the third horizontal period, the blue sub-pixels B1 and B3 of the first pixel and the third pixel arranged in the even-numbered columns of the second row and the six row may be read out; and in the fourth horizontal period, the second green sub-pixels Gb1 and Gb3 of the first pixel and the third pixel arranged in the odd-numbered columns of the second row and the sixth row may be read out. In addition, in the fifth horizontal period, the first green sub-pixels Gr2 and Gr4 of the second pixel and the fourth pixel arranged in the even-numbered columns of the third row and the seventh row may be read out; in the sixth horizontal period, the red sub-pixels R2 and R4 of the third pixel and the seventh pixel arranged in the odd-numbered columns of the third row and the seventh row may be read out; in the seventh horizontal period, the blue sub-pixels B2 and B4 of the second pixel and the fourth pixel arranged in the even-numbered columns of the fourth row and the eighth row may be read out; and in the eighth horizontal period, the second green sub-pixels Gb2 and Gb4 of the second pixel and the fourth pixel arranged in the odd-numbered columns of the fourth row and the eighth row may be read out.

When the CIT is set to 4 or more, four sub-pixels may be sequentially read from one pixel among two adjacent pixels connected to the same column line (e.g., the first pixel PX1 and the second pixel PX2, or the third pixel PX3 and the fourth pixel PX4), and then four sub-pixels may be sequentially read from the other pixel.

FIG. 13 is a timing diagram for describing reset and readout according to a change in an exposure time setting value in an image sensor according to some example embodiments.

Referring to FIG. 13, the CIT may be set to 8 for a first frame period. A first reset may be sequentially performed on a plurality of rows of the pixel array (110 of FIG. 1) from a shutter frame period, and a first readout may be sequentially performed on the plurality of rows in the first frame period. Here, the first reset and the first read refer to the reset and readout of sub-pixels, performed based on recalculated row address generated by the first address recalculation circuit (145 of FIG. 11). In a first frame, sub-pixels may be read out according to a third pattern as described with reference to FIG. 8D.

The CIT may be changed to 1, and accordingly, a second reset may be performed from the first frame period, and a second readout may be performed during a second frame period. Here, the second reset and the second readout refer to reset and readout of sub-pixels, performed based on a re-calculation row address generated by the second address recalculation circuit (146 of FIG. 11). In a second frame, sub-pixels may be read out according to a first pattern, as described with reference to FIG. 8A.

The CIT may be changed to 2, and accordingly, the first reset may be performed from a second frame period, and the first readout may be performed during a third frame period. In the third frame period, sub-pixels may be read out according to a second pattern, as described with reference to FIG. 8B.

When the CIT is changed to 12, the second reset may be performed from the third frame period, and the second readout may be performed during a fourth frame period. In the fourth frame period, sub-pixels may be read out according to the third pattern.

When the timing generator (140 in FIG. 1) includes two sets of address generation circuits (for example, the first address generation circuit 143 of FIG. 11 and the first address recalculation circuit 145 of FIG. 11 and the second address generation circuit 144 of FIG. 11 and the second address recalculation circuit 146 of FIG. 11), and the CIT is changed, by alternately using the two sets of address generation circuits, the changed CIT may be immediately applied to a next frame. Accordingly, despite the change in the CIT, the occurrence of a dead frame may be prevented or reduced.

Figure 14:
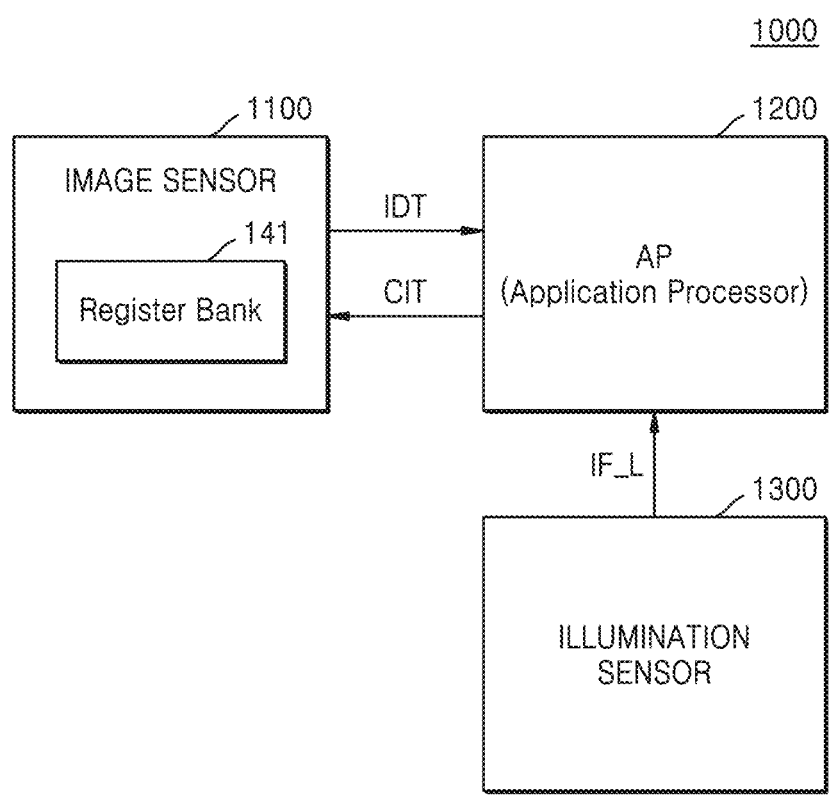
FIG. 14 is a schematic block diagram of an electronic device including an image sensor according to some example embodiments.

FIG. 14 is a schematic block diagram of an electronic device 1000 including an image sensor according to some example embodiments.

Referring to FIG. 14, the electronic device 1000 may include an image sensor 1100, an application processor (AP) 1200, and an illuminance sensor 1300.

The AP 1200 may provide control signals controlling the operation of the image sensor 1100, to the image sensor 1100. Transmission of control signals may be performed, for example, based on an 12C-based interface. The control signals may include an exposure time setting value, for example, a CIT. The control signals may further include configuration data of the image sensor 1100, such as a lens shading correction value, a cross-talk coefficient, and/or a gain.

The image sensor 1100 may generate the image data IDT by capturing an image of an object based on the received control signals. The image data IDT may include a still image and a moving image. The image sensor 1100 may perform signal processing such as image quality compensation, binning, and/or downsizing, on the image data IDT, and the image quality compensation may include, for example, black level compensation, lens shading compensation, crosstalk compensation, and/or bad pixel correction.

The image sensor 1100 may transmit the image data IDT or signal-processed image data to the application processor 1200. The image data IDT may be transmitted using, for example, a Camera Serial Interface (CSI) based on a Mobile Industry Processor Interface (MIPI), but some example embodiments are not limited thereto.

The application processor 1200 may perform, on the received image data IDT, bad pixel correction, 3A adjustment (Auto-focus correction, Auto-white balance, Auto-exposure), noise reduction, sharpening, gamma control, remosaic, demosaic, resolution scaling (video/preview), high dynamic range (HDR) processing, and the like.

The illuminance sensor 1300 may sense the ambient illuminance of the electronic device 1000 and generate illuminance information IF_L. The illuminance information IF_L may include an illuminance value.

According to some example embodiments, the application processor 1200 may receive the illuminance information IF_L about the ambient illuminance of the electronic device 1000 from an external illuminance sensor, and adjust an exposure time setting value, for example, a CIT, based on the illuminance information IF_L. For example, the application processor 1200 may change the CIT every frame based on the illuminance information IF_L. As another example, the application processor 1200 may change the CIT whenever an illuminance value included in the illuminance information IF_L is changed beyond a certain range; and when the illuminance decreases, the application processor 1200 may increase an exposure time by setting a relatively large CIT, and when the illuminance increases, the application processor 1200 may reduce the exposure time by setting a relatively small CIT.

The application processor 1200 transmits an exposure time setting value, for example, CIT, to the image sensor 1100 as a control signal, and the exposure time setting value may be stored in the register bank 141.

The exposure time setting value may be used, as described with reference to FIGS. 11 to 12C, in generating a reset timing signal and a recalculated row address (e.g., the first recalculated row address RR_ADD_0 and the second recalculated row address RR_ADD_1) in the timing controller 140. An exposure time of a plurality of rows of the pixel array (110 of FIG. 1) may be set according to the exposure time setting value, and the reset order and readout order of the plurality of rows of the pixel array 110, and a reset time and a readout time thereof may be determined according to the exposure time setting value.

The image sensor 100 described with reference to FIGS. 1 to 13 may be applied to the image sensor 1100. The pixel array has a shared pixel structure, and the reset and readout orders of a plurality of sub-pixels of two adjacent pixels in a column direction may be changed (adjusted) according to an exposure time setting value, and a sub-pixel of the second pixel may be reset in a horizontal period in which a sub-pixel of the first pixel is read out, and another sub-pixel of the first pixel may be reset in a horizontal period in which the sub-pixel of the second pixel is read out. As the first pixel and the second pixel alternately perform the reset of sub-pixels and the readout of sub-pixels every at least one horizontal period, the restrictions on exposure time setting may be eliminated or reduced and a minimum exposure time may be set as desired. Accordingly, a dynamic range of the image sensor 1100 may be increased even in a super high light environment.

The image sensor 100 (or other circuitry discussed herein, for example, the row driver 120, ADC circuit 130, timing controller 140, image converting circuit 150, memory 160, register bank 141, buffer 142, first address generation circuit 143, second address generation circuit 144, first address recalculation circuit 145, second address recalculation circuit 146, address output circuit 147, electronic device 1000, AP 1200, and illuminance sensor 1300) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An image sensor comprising:
   a pixel array comprising a first pixel and a second pixel which are connected to a same column line, the first pixel comprising N sub-pixels sharing a first floating diffusion node and the second pixel comprising N sub-pixels sharing a second floating diffusion node, wherein N is a positive integer greater than or equal to two;
   a timing generator configured to change a reset order and a readout order of 2N sub-pixels included in the first pixel and the second pixel, according to an exposure time setting value, and output a row address according to the changed orders; and
   a row driver configured to drive the pixel array based on the row address, wherein
   in a first horizontal period, a first sub-pixel of the first pixel is read out and a second sub-pixel of the second pixel is reset, and
   in a second horizontal period, the second sub-pixel of the second pixel is read out, and a third sub-pixel of the first pixel is reset.

2. The image sensor of claim 1, wherein the timing generator is configured to change the reset order and the readout order of the 2N sub-pixels such that a first sub-pixel of the first pixel is read out and a second sub-pixel of the second pixel is reset in a first horizontal period, and the second sub-pixel of the second pixel is read out and a third sub-pixel of the first pixel is reset in a second horizontal period.

3. The image sensor of claim 1, wherein the first pixel further comprises:
   a first reset transistor configured to provide a reset voltage to the first floating diffusion node in response to a first reset signal of an active level;
   a first driving transistor configured to generate a first pixel signal corresponding to an electric potential of the first floating diffusion node; and
   a first selection transistor configured to output the first pixel signal to the column line in response to a first selection signal of an active level,
   wherein, based on a sub-pixel of the first pixel being reset, the first selection transistor is turned off in response to the first selection signal of an inactive level.

4. The image sensor of claim 3, wherein, based on the sub-pixel of the first pixel being read out, the first selection transistor is turned on in response to the first selection signal of an active level, and the first reset transistor is turned off in response to the first reset signal of an inactive level.

5. The image sensor of claim 1, wherein, after the second sub-pixel of the second pixel is reset and before the second sub-pixel of the second pixel is read out, up to two sub-pixels among fourth to fifth sub-pixels provided in the first pixel and the second pixel are reset.

6. The image sensor of claim 1, wherein, based on the exposure time setting value having a first value, the second horizontal period is subsequent to the first horizontal period.

7. The image sensor of claim 1, wherein, based on the exposure time setting value having a second value, in a third horizontal period between the first horizontal period and the second horizontal period, a fourth sub-pixel of the first pixel is read out, and a fifth sub-pixel of the second pixel is reset.

8. The image sensor of claim 1, wherein, based on the exposure time setting value having a third value, in a third horizontal period subsequent to the first horizontal period, a fourth sub-pixel of the first pixel is reset and a fifth sub-pixel of the second pixel is read out, and in a fourth horizontal period subsequent to the third horizontal period, a sixth sub-pixel of the first pixel is read out and a seventh sub-pixel of the second pixel is reset, and
   the second horizontal period is subsequent to the fourth horizontal period.

9. The image sensor of claim 1, wherein the timing generator comprises:
   a register configured to store the exposure time setting value and a set of a plurality of tuning values corresponding to a plurality of exposure time setting values; and
   an address generation circuit configured to generate a reference address based on the exposure time setting value and generate a recalculated row address according to the changed reset order and readout order of the 2N sub-pixels, by applying a set of tuning values corresponding to the exposure time setting value, to the reference address.

10. The image sensor of claim 9, wherein the timing generator further comprises a double buffer configured to receive, from the register, a first exposure time setting value corresponding to a first frame and a set of first tuning values, and a second exposure time setting value corresponding to a second frame and a set of second tuning values, and transmit, to the address generation circuit in response to an update timing signal, the first exposure time setting value and the set of first tuning values or the second exposure time setting value and the set of second tuning values.

11. The image sensor of claim 1, further comprising an image data converting circuit configured to store, in a line buffer, image data generated according to pixel signals output from the pixel array, and convert the image data to image data of a Bayer pattern.

12. The image sensor of claim 1, wherein the N sub-pixels are arranged in a 2×2 matrix.

13. The image sensor of claim 12, wherein two sub-pixels arranged in a first diagonal direction convert optical signals of different frequency bands into electrical signals, and two other sub-pixels arranged in a second diagonal direction convert optical signals of a same frequency band into electrical signals.

14. An image sensor comprising:

a pixel array comprising a plurality of pixels arranged in a matrix, the plurality of pixels each comprising N sub-pixels sharing a floating diffusion node, wherein N is an integer greater than or equal to 2;

a timing generator configured to set a reset order and a readout order of 2N sub-pixels according to an exposure time setting value such that, while the 2N sub-pixels provided in a first pixel and a second pixel of the plurality of pixels which are adjacent in a column direction are sequentially read out, in a first horizontal period, a first sub-pixel of the first pixel is read out and a second sub-pixel of the second pixel is reset, and in a second horizontal period, the second sub-pixel of the second pixel is read out and a third sub-pixel of the first pixel is reset; and a row driver configured to drive the pixel array based on a row address provided by the timing generator, according to the reset order and the readout order of the 2N sub-pixels, wherein when the exposure time setting value is set to a second value, in a third horizontal period between the first horizontal period and the second horizontal period, a fourth sub-pixel of the first pixel is read out, and a fifth sub-pixel of the second pixel is reset.

15. The image sensor of claim 14, wherein, based on the exposure time setting value being set to a first value, the second horizontal period is subsequent to the first horizontal period.

16. An electronic device comprising:

an image sensor which includes a pixel array comprising a plurality of pixels and is configured to generate image data based on an optical signal received by the pixel array; and an application processor configured to generate an exposure time setting value based on illuminance information indicating an ambient illuminance and transmit the exposure time setting value to the image sensor, wherein the plurality of pixels comprise a first pixel and a second pixel which are connected to a same column line, and the first pixel and the second pixel each include a plurality of sub-pixels sharing a floating diffusion node, and a reset order and a readout order of the plurality of sub-pixels of the first pixel and the second pixel are changed according to the exposure time setting value, wherein the image sensor is further configured to determine the reset order and the readout order of the plurality of sub-pixels such that, in a first period, a first sub-pixel of the first pixel is read out and a second sub-pixel of the second pixel is reset, and in a second period, the second sub-pixel of the second pixel is read out and a third sub-pixel of the first pixel is reset.

17. The electronic device of claim 16, wherein the image sensor further comprises a register bank configured to store the exposure time setting value and a timing generator configured to determine the reset order and the readout order of the plurality of sub-pixels of the first pixel and the second pixel based on the exposure time setting value.

* * * * *